United States Patent
Patchava et al.

(10) Patent No.: US 11,616,676 B1
(45) Date of Patent: Mar. 28, 2023

(54) PHASE TRACKING REFERENCE SIGNAL PHASE NOISE TRACKING

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/652,254

(22) Filed: Feb. 23, 2022

(51) Int. Cl.
*H04L 27/26* (2006.01)
*H04L 5/00* (2006.01)

(52) U.S. Cl.
CPC ........ *H04L 27/2639* (2013.01); *H04L 5/0007* (2013.01); *H04L 5/0016* (2013.01); *H04L 27/26532* (2021.01)

(58) Field of Classification Search
CPC . H04L 27/2639; H04L 5/0007; H04L 5/0005; H04L 5/0016; H04L 5/0017; H04L 5/0019; H04L 5/0021; H04L 27/26532
See application file for complete search history.

(56) References Cited

U.S. PATENT DOCUMENTS

| | | | | |
|---|---|---|---|---|
| 2017/0063590 | A1* | 3/2017 | Dhananjay | H04L 27/2602 |
| 2019/0166625 | A1* | 5/2019 | Nam | H04B 7/0626 |
| 2020/0120645 | A1* | 4/2020 | Park | H04L 5/0053 |
| 2020/0252181 | A1* | 8/2020 | Gao | H04L 27/18 |
| 2021/0058207 | A1* | 2/2021 | Lee | H04L 5/0051 |
| 2021/0168011 | A1* | 6/2021 | Davydov | H04L 1/0003 |
| 2022/0312334 | A1* | 9/2022 | Gao | H04W 52/241 |
| 2022/0312500 | A1* | 9/2022 | Cao | H04L 1/0003 |

* cited by examiner

*Primary Examiner* — Khanh C Tran
(74) *Attorney, Agent, or Firm* — Procopio, Cory, Hargreaves & Savitch LLP

(57) ABSTRACT

Method and apparatus for PTRS for OTFS waveforms. The apparatus measures a PTRS using an OTFS including a delay-Doppler domain. The OTFS includes a plurality of symbols in the delay-Doppler domain based on the PTRS. A first symbol of the plurality of symbols includes a first PTRS resource sample having a first value in the delay-Doppler domain. A second symbol of the plurality of symbols includes a second PTRS resource sample having a second value in the delay-Doppler domain. The first PTRS resource sample is adjacent to the second PTRS resource sample. The apparatus performs phase noise tracking for a data channel based on the measured PTRS.

30 Claims, 17 Drawing Sheets

PHASE TRACKING REFERENCE SIGNAL PHASE NOISE TRACKING

TECHNICAL FIELD

The present disclosure relates generally to communication systems, and more particularly, to a configuration for phase tracking reference signal (PTRS) for orthogonal time frequency space (OTFS) waveforms.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and neither identifies key or critical elements of all aspects nor delineates the scope of any or all aspects. Its sole purpose is to present some concepts of one or more aspects in a simplified form as a prelude to the more detailed description that is presented later.

Some aspects described herein relate to a network node for wireless communication. The network node may include a memory, and at least one processor communicatively coupled to the memory. The at least one processor may be configured to measure a phase tracking reference signal (PTRS) using an orthogonal time frequency space (OTFS) including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample. The at least one processor may be configured to perform phase noise tracking for a data channel based on the measured PTRS.

Some aspects described herein relate to a method of wireless communication performed by a network node. The method may include measuring a phase tracking reference signal (PTRS) using an orthogonal time frequency space (OTFS) including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample. The method may include performing phase noise tracking for a data channel based on the measured PTRS.

Some aspects described herein relate to a non-transitory computer-readable medium having code stored thereon that, when executed by a first network node, causes the first network node to measure a phase tracking reference signal (PTRS) using an orthogonal time frequency space (OTFS) including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample; and perform phase noise tracking for a data channel based on the measured PTRS.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
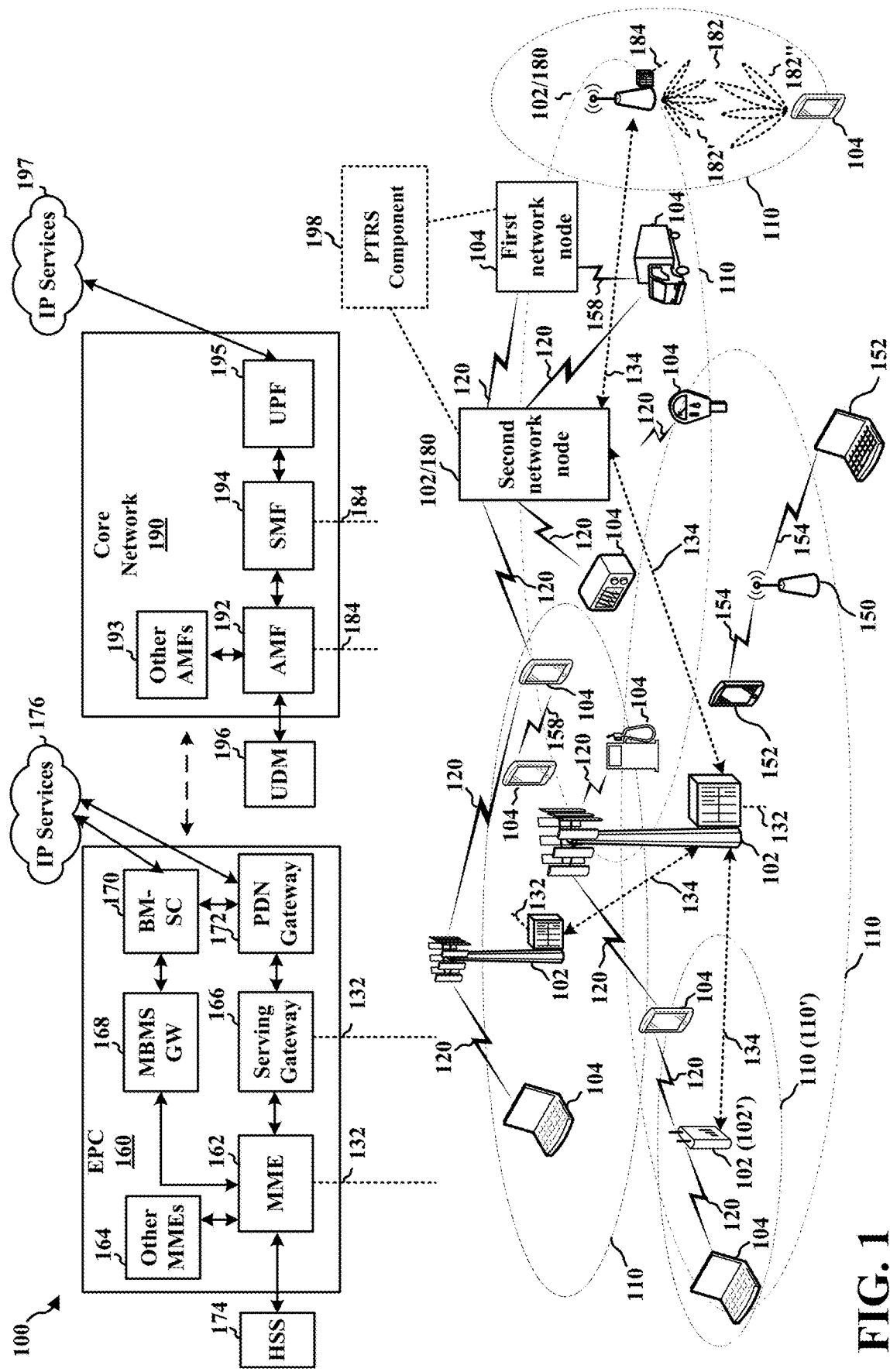
FIG. 1 is a diagram illustrating an example of a wireless communications system and an access network.

The detailed description set forth below in connection with the drawings describe various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and use cases are described in this application by illustration to some examples, additional or different aspects, implementations, use cases may come about in many different arrangements and scenarios. The techniques described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). Implementations may range a spectrum from chip-level or modular components to non-modular, non-chip-level implementations and further to aggregate, distributed, or original equipment manufacturer (OEM) devices or systems incorporating one or more techniques described herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). The techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first network node 104 may be configured to perform phase noise tracking for a data channel based on measured PTRS. For example, the first network node 104 may comprise a PTRS component 198 configured to perform phase noise tracking for a data channel based on measured PTRS. As described herein, a network node, which may be referred to as a node, a network node, a communication node, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

Although the following description may be focused on 5G NR, the concepts described herein may be applicable to other similar areas, such as LTE, LTE-A, CDMA, GSM, and other wireless technologies.

Figure 2:
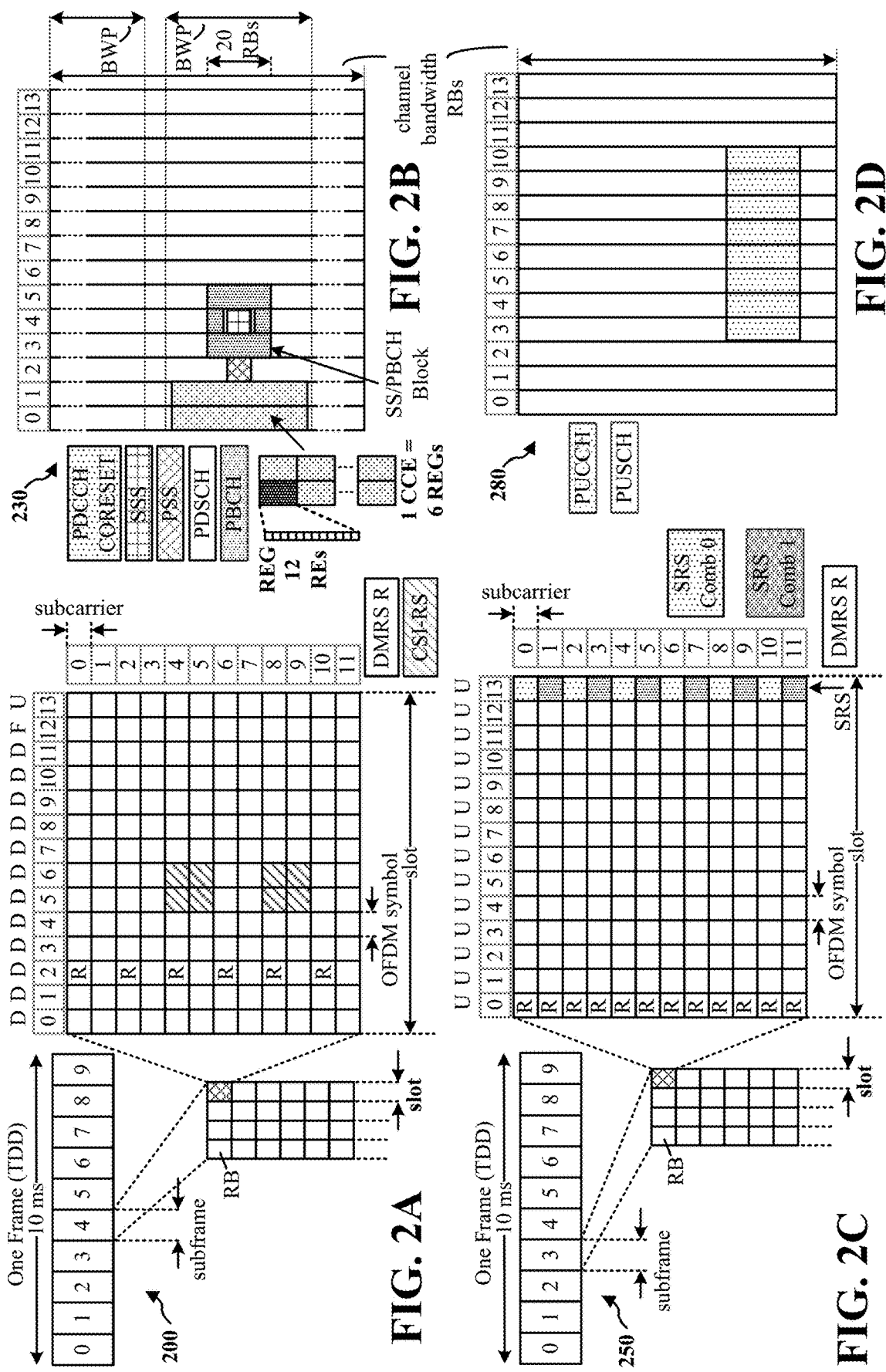
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
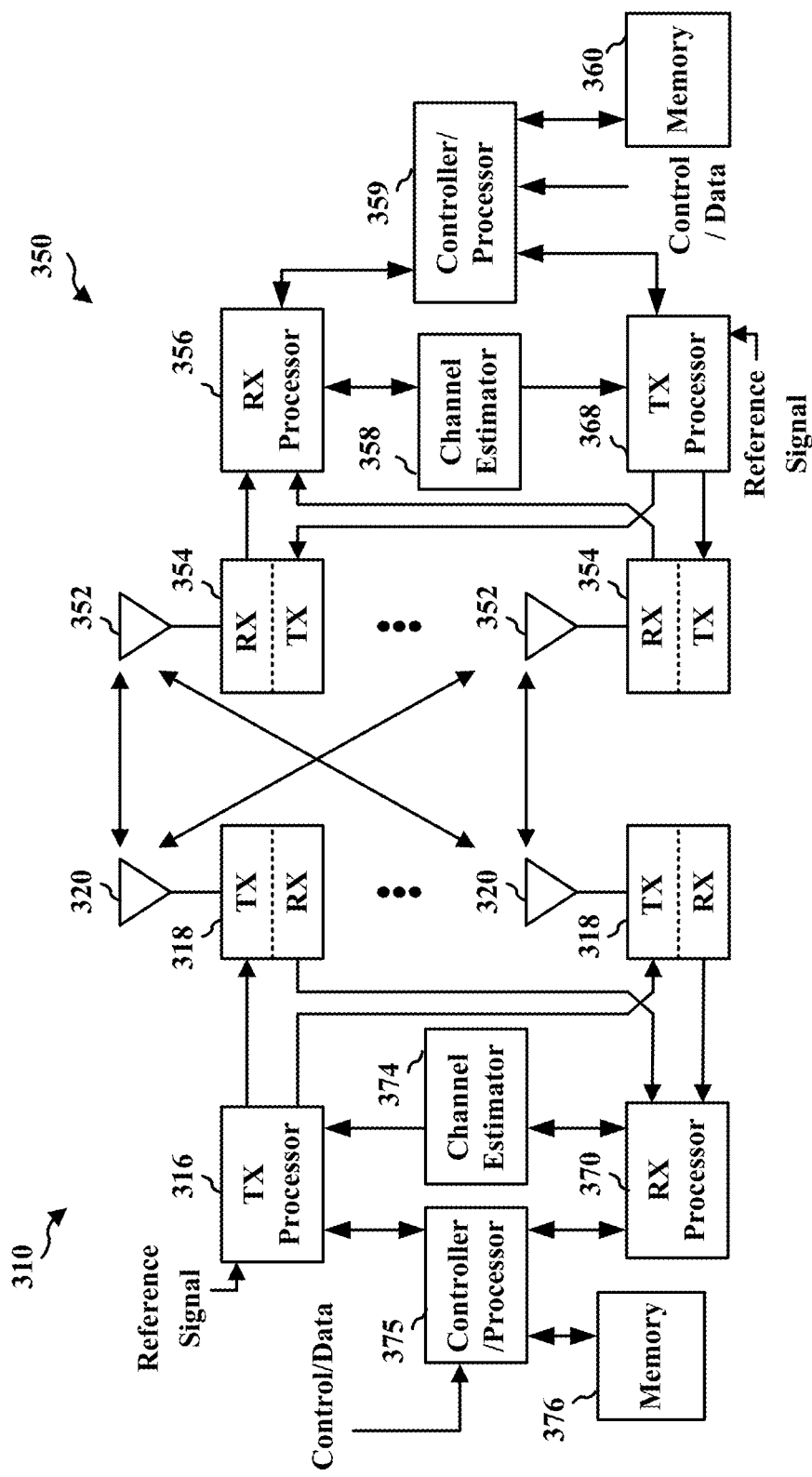
FIG. 3 is a diagram illustrating an example of a base station and user equipment (UE) in an access network.

FIG. 3 is a block diagram of a second network node 310 (e.g., base station) in communication with a first network node 350 (e.g., UE) in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the first network node 350 (e.g., UE), each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the second network node 310 (e.g., base station), the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the second network node 310 (e.g., base station) in a manner similar to that described in connection with the receiver function at the first network node 350 (e.g., UE). Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the first network node 350 (e.g., UE). IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In wireless communications, PTRS may allow a receiver of a network node to estimate and compensate phase noise and frequency offsets of a received signal. PTRS may allow for suppression of phase noise and frequency offsets at higher millimeter wave (mmW) frequencies. Transmission of PTRS in an OFDM waveform may be uniformly spaced over time and frequency with the density based on the MCS and the number of RBs transmitted. An OTFS waveform may be configured to support high Doppler channels by transmitting information symbols within a delay-Doppler domain as opposed to a time-frequency domain. OTFS may have some advantages over OFDM, such as but not limited to, constant fading or multi-path diversity. PTRS in OFDM may not be applicable to OTFS due to OTFS transmitting information symbols in the delay-Doppler domain.

Aspects presented herein provide a configuration for PTRS in a delay-Doppler domain to be applicable for an OTFS waveform. For example, a first network node may be configured to perform phase noise tracking for a data channel based on measured PTRS. The first network node may measure a PTRS using an OTFS including a delay-Doppler domain. The OTFS may include a plurality of symbols in the delay-Doppler domain based on the PTRS. A first symbol of the plurality of symbols may include a first PTRS resource sample having a first value in the delay-Doppler domain. A second symbol of the plurality of symbols may include a second PTRS resource sample having a second value in the delay-Doppler domain. The first PTRS resource sample may be adjacent to the second PTRS resource sample. The first network node may perform phase noise tracking for a data channel based on the measured PTRS.

Figure 4:
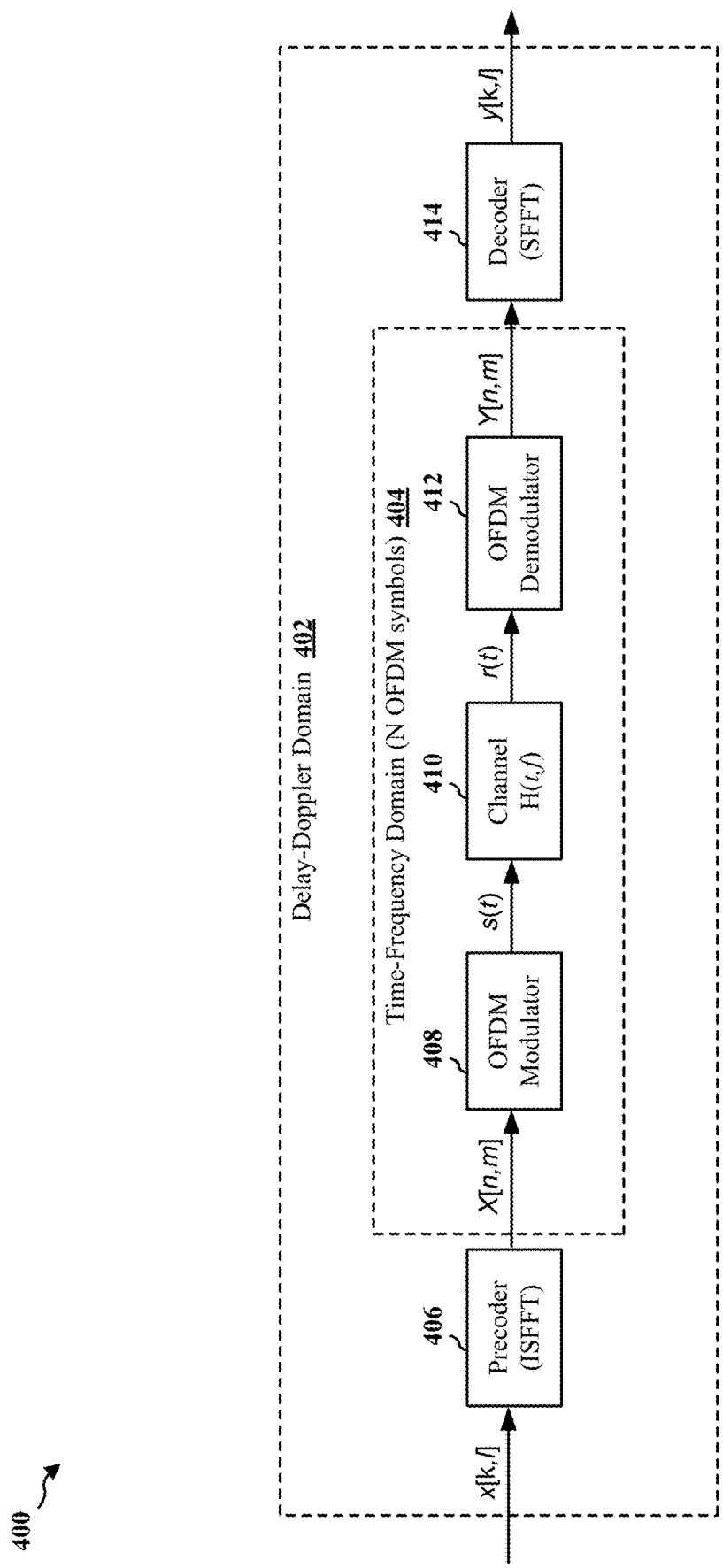
FIG. 4 is a diagram illustrating an example of an OTFS modulation scheme.

FIG. 4 is a diagram 400 of an OTFS modulation scheme. The diagram 400 includes a time-frequency domain 404 and the delay-Doppler domain 402. The delay-Doppler domain 402. The delay-Doppler domain 402 comprises the precoder 406 and the decoder 414. The precoder 406 and the decoder 414 may operate in the delay-Doppler domain. The time-frequency domain 404 includes the OFDM modulator 408, the channel 410, and the OFDM demodulator 412. Information symbols (e.g., x[k,l]) may be the input to the precoder 406 which may be in the delay-Doppler domain. Information symbols (e.g., x[k,l]) may be mapped into the time-frequency domain (e.g., X[n,m]) via the precoder 406 and provided to the OFDM modulator 408. Otherwise described, precoder 406 may process the information symbols in the delay-Doppler domain and output time-frequency domain information (e.g., X[n,m]) based on received input information (e.g., x[k,l]). The precoder 406 may comprise an 2D inverse symplectic finite Fourier transform (ISFFT). OTFS modulation may, in some examples be interpreted as an ISFFT precoder applied on N consecutive OFDM symbols. The output of the OFDM modulator 408 (e.g., s(t)) may be transmitter over channel 410 (e.g., H(t,f)) to produce the signal r(t). The signal r(t) is demodulated using OFDM demodulator 412 to obtain the information symbols (e.g., Y[n,m]). The information symbols (e.g., Y[n,m]) may be in the time-frequency domain and are inputted into the decoder 414, where the decoder 414 processes the time-frequency domain information symbols (e.g., Y[n,m]) and are mapped back to the delay-Doppler domain via the decoder 414 to obtain the delay-Doppler domain symbols (e.g., y[k,l]). The decoder 414 may comprise a symplectic finite Fourier transform (SFFT).

The information symbols (e.g., x[k,l]) may be treated as points on a 2D delay-Doppler grid. The information symbols may be mapped in the delay-Doppler domain to time-frequency domain through the ISFFT operation, represented by the equation:

$$X[n,m] = \frac{1}{\sqrt{NM}} \sum_{k=0}^{N-1} \sum_{l=0}^{M-1} \times [k,l] e^{j2\pi\left(\frac{nk}{N} - \frac{ml}{M}\right)}$$

where N is the number of OFDM symbols, M is the number of subcarriers.

Due to ISFFT, each information symbol may occupy the entire time and bandwidth. Information symbols may be placed in the delay-Doppler domain rather than in the time-frequency domain in OFDM.

Figure 5:
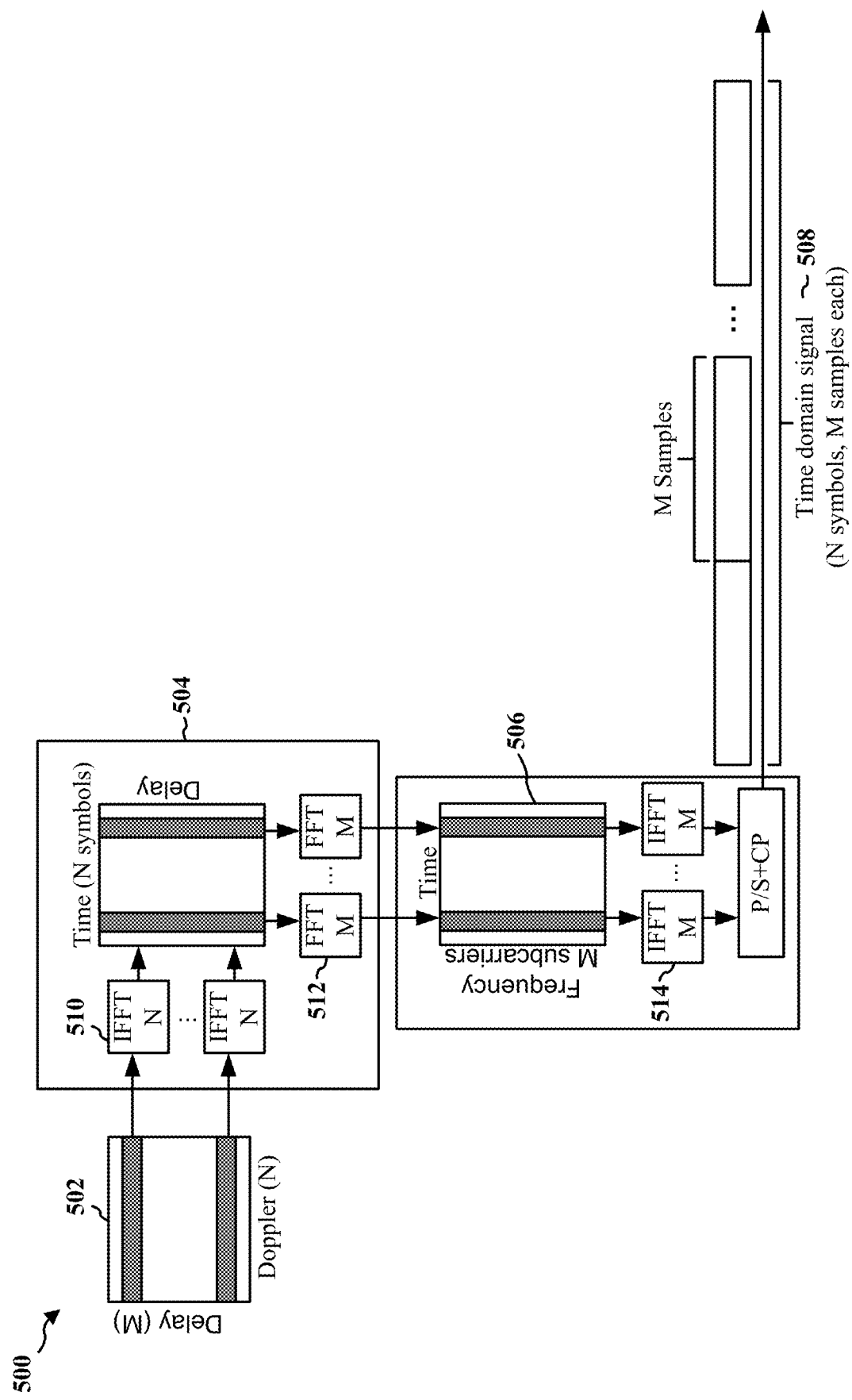
FIG. 5 is a diagram illustrating an example of a transmitter using OTFS and the delay-Doppler domain.

FIG. 5 is a diagram 500 of an example transmitter using OTFS and the delay-Doppler domain. The OTFS waveform 502 may comprise an M×N matrix, where M is the delay, and N is the Doppler. The OTFS waveform 502 may comprise The OTFS waveform 502 may be comprised of MN*$\log_2$ (Q) bits. The OTFS waveform 502 comprising the delay-Doppler information symbols may be converted to the time-frequency domain using ISFFT 504. The ISFFT 504 may comprise a plurality of IFFTs 510 that receive the waveform 502 and converts that N Doppler symbols into N time symbols. The waveform is then input into a plurality of FFTs 512 that produce the converted time-frequency domain information symbols 506, where the frequency includes M subcarriers. The symbols at the output of the ISFFT 504 represent the time-frequency domain, which may be similar as an OFDM waveform. The time-frequency domain information symbols 506 may be input into a plurality of IFFTs 514 to obtain the time-domain signal 508. The time-domain signal 508 may be comprised of N symbols, with each symbol having M samples.

Figure 6A:
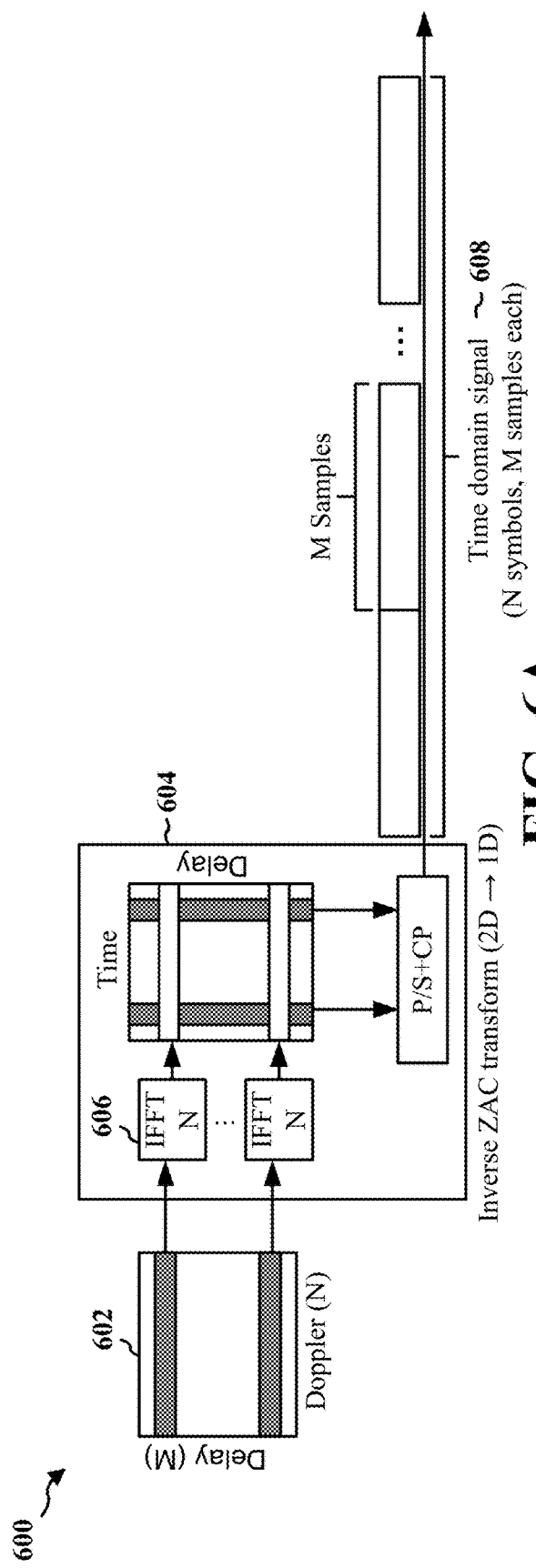
FIGS. 6A-6B are diagrams illustrating examples of OTFS.

FIG. 6A is a diagram 600 illustrating an example of OTFS in accordance with the techniques described herein. For example, the diagram 600 provides an example of an ISFFT size. The OTFS waveform 602, which may be similar to OTFS waveform 502, may be provided to the plurality of IFFTs 606 of the precoder 604 to perform an inverse ZAC transform, which converts the 2D waveform 602 to a 1D waveform.

Figure 6B:
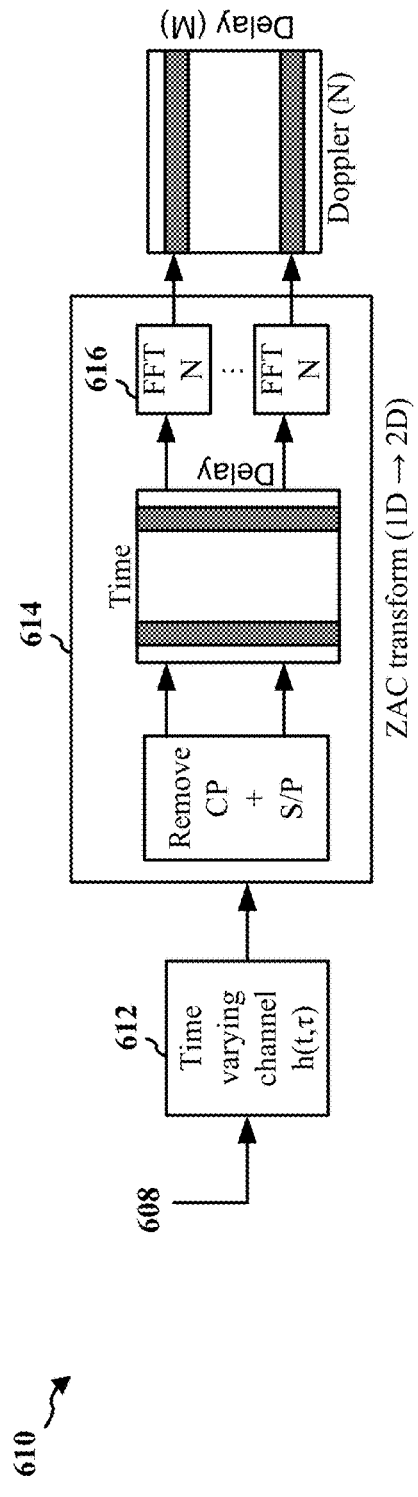

FIG. 6B is a diagram 610 illustrating an example of OTFS in accordance with the techniques described herein. For example, the diagram 610 provides an example of an FFT size. The 1D waveform 608 of FIG. 6A, may be transmitted over a time varying channel 612. The received channel may be demodulated via demodulator 614 to perform a ZAC transform, which converts the 1D waveform back to a 2D waveform. The received channel may be provided to the plurality of FFTs 616 to perform the ZAC transform, which results in the delay-Doppler domain information symbols.

Figure 7:
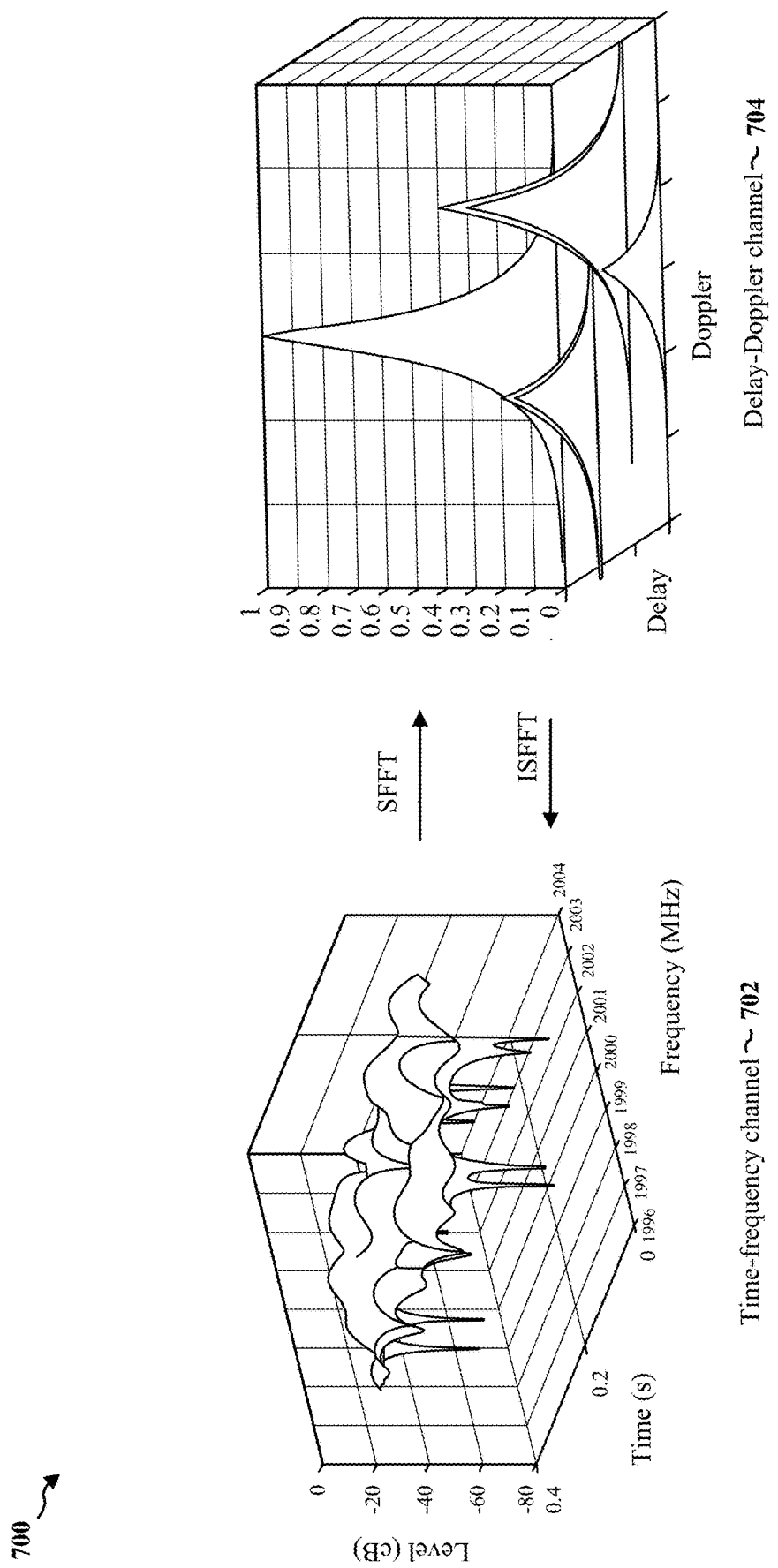
FIG. 7 is a diagram illustrating an example of OTFS channel estimation.

FIG. 7 is a diagram 700 of example OTFS channel estimation. For example, a network node may use OTFS to estimate the delay-Doppler channel rather than the time-frequency channel by placing pilot symbols in the delay-Doppler domain. Each pilot symbol may occupy the entire time-frequency plane, due to the ISFFT transform. The delay-Doppler channel 704 may be related to the time-frequency channel 702 through ISFFT transform and its estimation may have several advantages over the time-frequency channel 702. For example, the delay-Doppler channel 704 may be sparse. In addition, the delay-Doppler channel 704 may occupy a smaller portion of the grid, in comparison to the time-frequency channel 702. The maximum delay and Doppler spreads of the delay-Doppler channel 704 may be much smaller than the symbol duration and sub-carrier spacing of the time-frequency channel 702. In some instances, the delay-Doppler channel 704 may be less than 20%, for example, in each dimension.

Figure 8:
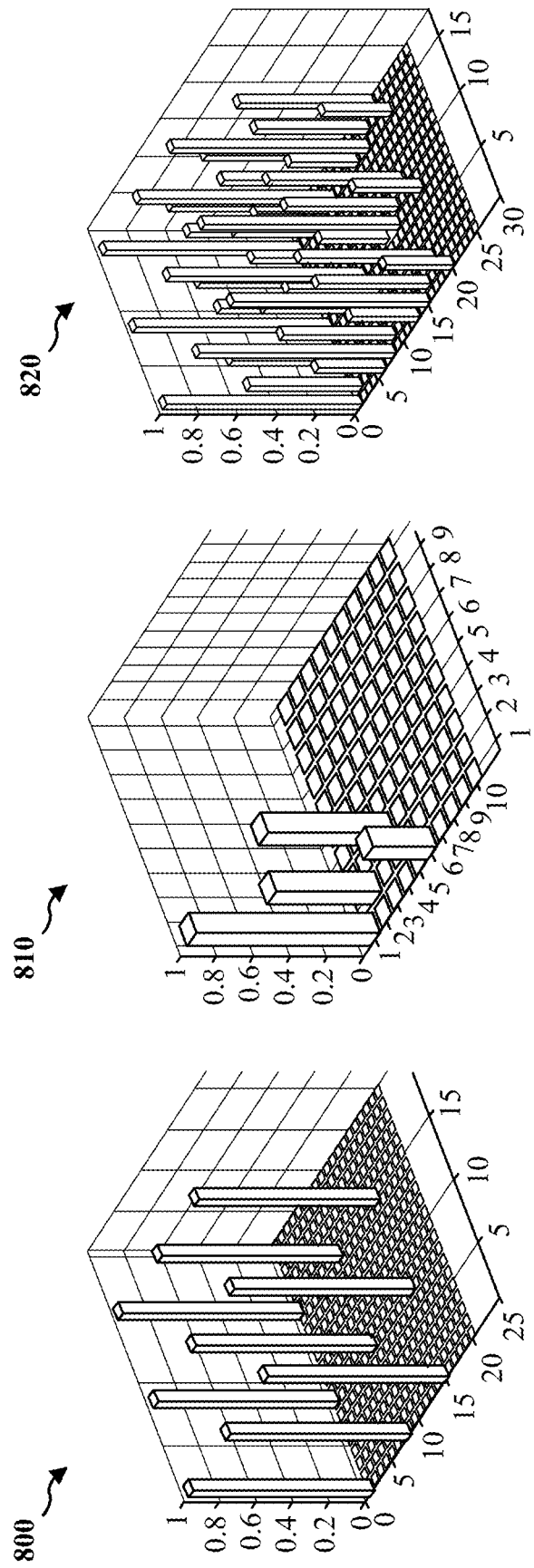
FIGS. 8A-8C are diagrams illustrating examples of OTFS input-output relations.

FIGS. 8A-8C are diagrams 800, 810, 820, respectively, of example OTFS input-output relations. Diagram 800 of FIG. 8A provides an example of an input signal (e.g., x[k,l]). Diagram 810 of FIG. 8B provides an example of a channel (e.g., h[k,l]). Diagram 820 of FIG. 8C provides an example of an output signal (e.g., y[k,l]). The OTFS input-output relations in the case of the delay-Doppler channel may comprise a 2D circular convolution with varying phase shifts, which may be expressed by the following equation:

$$y[k,l] = \sum_{i=1}^{P} h_i e^{j2\pi\left(\frac{l-l_{\tau_i}}{M}\right)\frac{k_{v_i}}{N}} \underbrace{\alpha_i(k,l)}_{|C|\&|S|} \times \left[[k-k_{v_i}]_N, [l-l_{\tau_i}]_M\right]$$

where $$\alpha_i(k,l) = \begin{cases} 1 & l_{\tau_i} \leq l < M \\ e^{-j2\pi\left(\frac{[k-k_{v_i}]_N}{N}\right)} & 0 \leq l < l_{\tau_i} \end{cases},$$

P is the number of delay-Doppler paths, $l\tau$ and $k_v$ are the delay and Doppler taps, respectively.

Due to the under-spread nature, the channel 804 may occupy a small fraction (e.g., around the origin) of the delay-Doppler grid.

Figure 9:
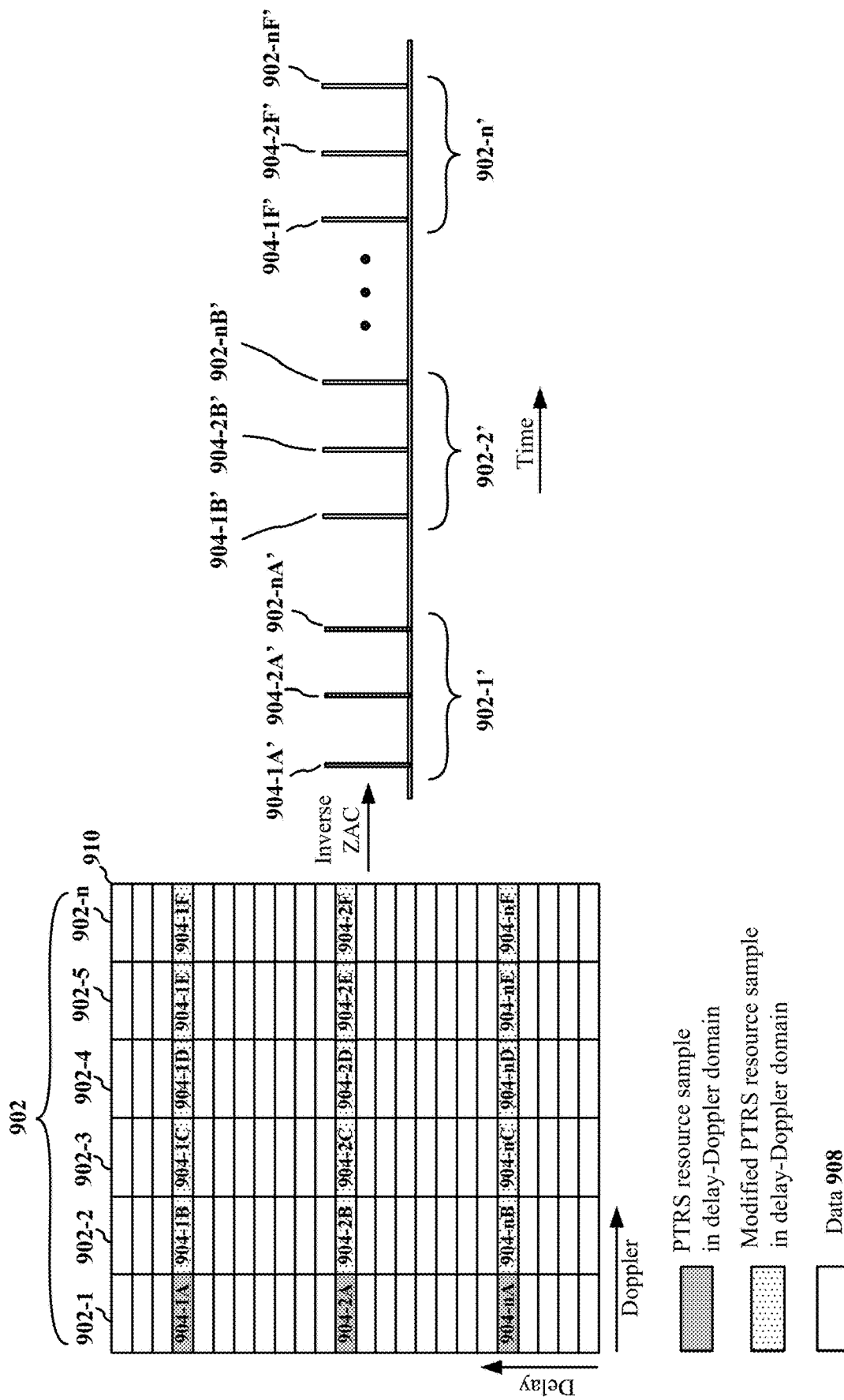
FIG. 9 illustrates an example of PTRS measured in the delay-Doppler domain.

FIG. 9 illustrates an example of one or more techniques described herein, such as use of the delay-Doppler domain to measure PTRS. Phase noise may change as a function of time. Tracking the phase noise may require more frequent pilots (e.g., PTRS resource samples) in the time domain, and less frequent pilots (e.g., PTRS resource samples) in the frequency domain. In some aspects, a network node described herein may be configured to receive a PTRS in the time domain. The PTRS may include a plurality of symbols. Each symbol of the PTRS may include one or more PTRS resource samples. The network node may be configured to convert the one or more PTRS resource samples into the delay-Doppler domain, such that the one or more PTRS resource samples are in the OTFS. In some aspects, the network node may be configured to modify one or more values corresponding to the one or more PTRS resource samples in the delay-Doppler domain. The network node may be configured transform a received PTRS into the delay-Doppler domain. In some aspects, the network node may be configured to transform a PTRS into the delay-Doppler domain by using a ZAC transform. As used herein, reference to a ZAC transform includes reference to the ZAC transform or any transform used convert information (e.g., samples) from the delay-Doppler domain information to the time domain, or vice-versa. Due to, for example, the ZAC transform, PTRS resource samples may be uniformly spread or spaced apart from other PTRS resource samples, which may enable phase noise tracking. In some aspects, a plurality of PTRS resource samples having a same, constant (e.g., zero values), or sequenced value in the delay-Doppler domain may result in the PTRS resource samples repeating in the time domain. PTRS resource sample density in the delay-Doppler domain may determine the PTRS density within a symbol and may be based on one or more factors, such as the phase noise and the MCS. The network node may be configured to apply an inverse ZAC transform on the PTRS resource samples in the delay-Dopper domain to convert or otherwise transform such PTRS resource samples into the time domain.

In the aspect shown, FIG. 9 illustrates a grid 910 having a Doppler axis and a Delay axis. Each cell in grid 910 represents a type of sample. While FIG. 9 shows two types of samples (a first type of samples being PTRS resource samples and a second type of samples being data samples), other aspects may include one or more additional types of samples (e.g., DMRS samples or any other type of sample). The z-axis may be viewed as extending perpendicularly away from the figure. For example, a PTRS resource sample value of a first value extends in the z-direction, and a PTRS resource sample value of a second value more than the first value extends in the z-direction by more than the first value. In this way, the two-dimensional grid 910 shows magnitude from a top view perspective due to the two-dimensional nature of the grid 910. The magnitude of each respective PTRS resource sample may be represented by a complex number (e.g., a +bj, where "a" represents the real component and "b" represents the imaginary component).

The aspect shown in FIG. 9 illustrates a plurality of symbols 902 in the delay-Doppler domain. The plurality of symbols 902 are represented by 902-1, 902-2, 902-3, 902-4, 902-5, and 902-n, where 902-n represents the nth symbol. In some aspects, the plurality of symbols 902 may include two or more symbols even though the aspect shown in FIG. 9 shows 5 symbols and an nth symbol. For example, n may equal two or more in such aspects. Each respective symbol of the plurality of symbols 902 may include one or more PTRS resource samples. Each PTRS resource sample may have a corresponding value.

Each respective symbol of the plurality of symbols 902 may include one or more PTRS resource samples. In the aspect of FIG. 9, each respective symbol includes its own respective data samples 908. Similarly, each respective symbol includes one or more respective PTRS resource samples 904. For example, symbol 902-1 includes one or more PTRS resource samples 904-1A (representing a first PTRS resource sample of symbol 902-1), 904-2A (representing a second PTRS resource sample of symbol 902-1), and 904-nA (representing an nth PTRS resource sample of symbol 902-1). Similarly, symbol 902-2 includes one or more PTRS resource samples 904-1B (representing a first PTRS resource sample of symbol 902-2), 904-2B (representing a second PTRS resource sample of symbol 902-2), and 904-nB (representing an nth PTRS resource sample of symbol 902-2). Similarly, symbol 902-n includes one or more PTRS resource samples 904-1F (representing a first PTRS resource sample of symbol 902-n), 904-2F (representing a second PTRS resource sample of symbol 902-n), and 904-nF (representing an nth PTRS resource sample of symbol 902-n).

In the aspect shown in FIG. 9, PTRS resource samples in a respective symbol of the plurality of symbols 902 are not adjacent to each other because there is at least one respective non-PTRS resource sample (e.g., data sample 908) separating them along the delay axis. PTRS resource samples 904-1A, 904-2A, and 904-nA in symbol 902-1 are not adjacent to each other because there is at least one respective data sample 908 (shown as 7 data samples in the illustrated aspect) separating them along the delay axis. Similarly, PTRS resource samples 904-1B, 904-2B, and 904-nB in symbol 902-2 are not adjacent to each other because there is at least one respective data sample 908 separating them along the delay axis. Similarly, PTRS resource samples 904-1F, 904-2F, and 904-nF in symbol 902-n are not adjacent to each other because there is at least one respective data sample 908 separating them along the delay axis. In some aspects, m data samples may separate PTRS resource samples in each symbol. In the aspect of FIG. 9, m is shown as equaling 7 (i.e., there are 7 data samples between the PTRS resource samples in each respective symbol of the plurality of symbols 902). However, in other aspects, m may be an integer greater than or less than 7, such as 1, 2, 3, 4, 5, 6, 8, 9, 10, 11, 12, 13, 14, 15, or greater.

In the aspect shown in FIG. 9, one or more PTRS resource samples of one symbol may be adjacent along the Doppler axis to one or more PTRS resource samples of one or more other symbols. For example, PTRS resource sample 904-1A is adjacent to PTRS resource sample 904-1B, PTRS resource sample 904-2A is adjacent to PTRS resource sample 904-2B, and PTRS resource sample 904-nA is adjacent to PTRS resource sample 904-nB. Similarly, PTRS resource sample 904-1D is adjacent to PTRS resource sample 904-1C and PTRS resource sample 904-1E, PTRS resource sample 904-2D is adjacent to PTRS resource sample 904-2C and PTRS resource sample 904-2E, and PTRS resource sample 904-nD is adjacent to PTRS resource sample 904-nC and PTRS resource sample 904-nE.

The network node may be configured to not modify the values of PTRS resource samples in the delay-Doppler domain corresponding to at least one symbol, and may be configured to modify the values of the one or more PTRS resource samples in the delay-Doppler domain corresponding to at least one symbol to be another value, such as zero. An unmodified value corresponding to a PTRS resource sample may be non-zero. A modified value corresponding to a PTRS resource sample may be zero or non-zero.

In the aspect shown in FIG. 9, the first symbol 902-1 is shown with unmodified or modified PTRS resource values, and the second symbol 902-2 through the nth symbol 902-n are shown as having modified PTRS resource values. In some aspects, the modified PTRS resource sample values may be zero. In other aspects, the modified PTRS resource sample values may be based on a sequence. In other aspects, the modified and the unmodified PTRS resource sample values may be based on a sequence, such as Zadoff Chu (ZC) sequence or a pseudo-random noise (PN) sequence. In some aspects, the PTRS resource sample values for the first symbol 902-1 may be non-zero, and the PTRS resource sample values for any other symbol may be zero.

The plurality of symbols 902 and the respective PTRS resource samples 904 corresponding thereto have been converted or transformed into the delay-Doppler domain. The plurality of symbols 902 and the respective PTRS resource samples 904 corresponding thereto are respectively converted or transformed into the plurality of symbols 902' and the respective PTRS resource samples 904' corresponding thereto in the time domain. For example, the network node may be configured to apply an inverse ZAC transform on the plurality of symbols 902 shown in grid 910 to transform them into the plurality of symbols 902' in the time domain, which is shown in the aspect of FIG. 9. For example, symbol 902-1 in the delay-Doppler domain corresponds to symbol 902-1' in the time domain. Similarly, PTRS resource samples 904-1A, 904-2A, and 904-nA in the delay-Doppler domain respectively correspond to PTRS resource samples 904-1A', 904-2A', and 904-nA' in the time domain. As another example, symbol 902-n in the delay-Doppler domain corresponds to symbol 902-n' in the time domain. Similarly, PTRS resource samples 904-1F, 904-2F, and 904-nF in the delay-Doppler domain respectively correspond to PTRS resource samples 904-1F', 904-2F', and 904-nF' in the time domain.

Figure 10A:
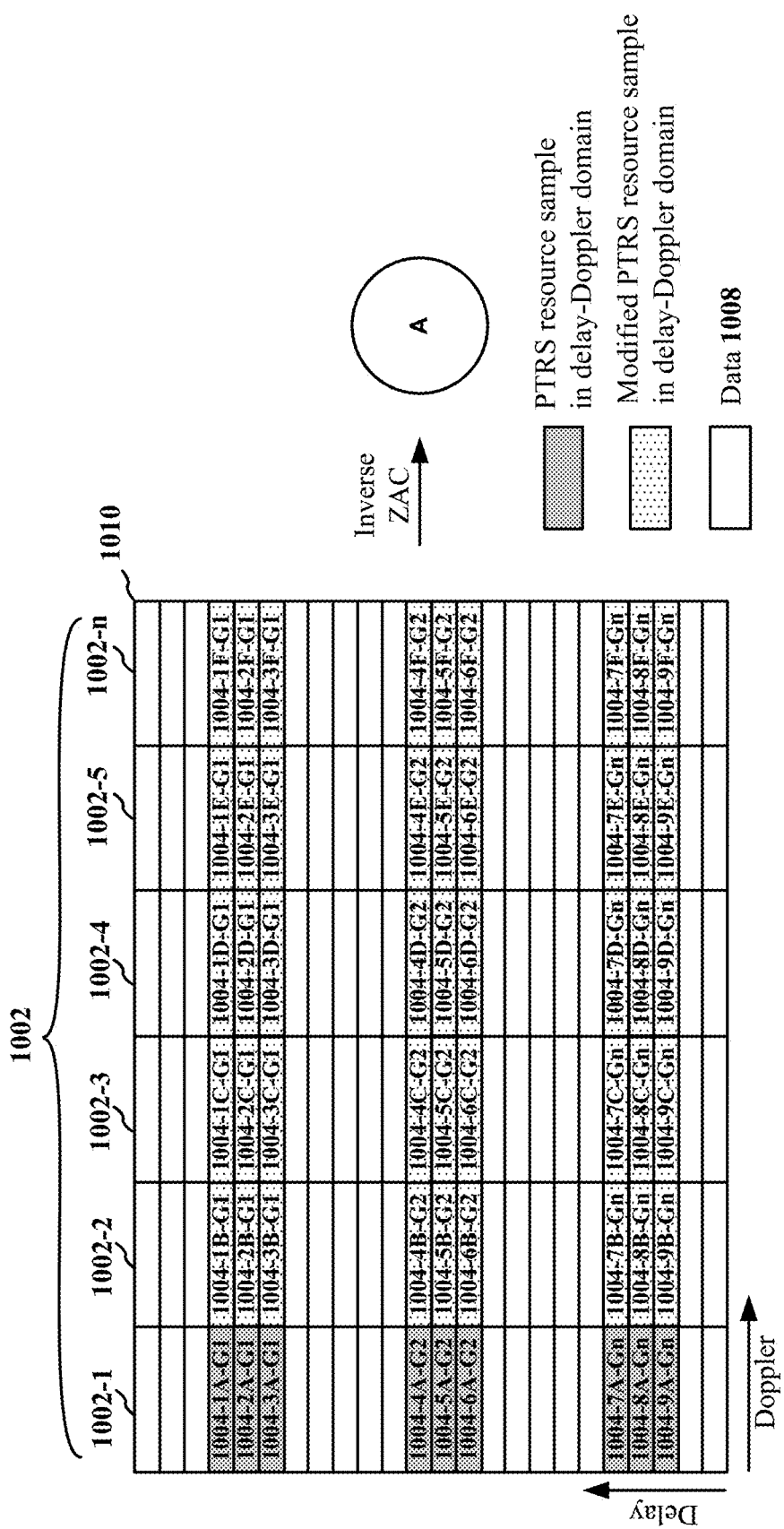
FIGS. 10A and 10B illustrate an example of PTRS measured in the delay-Doppler domain.
Figure 10B:
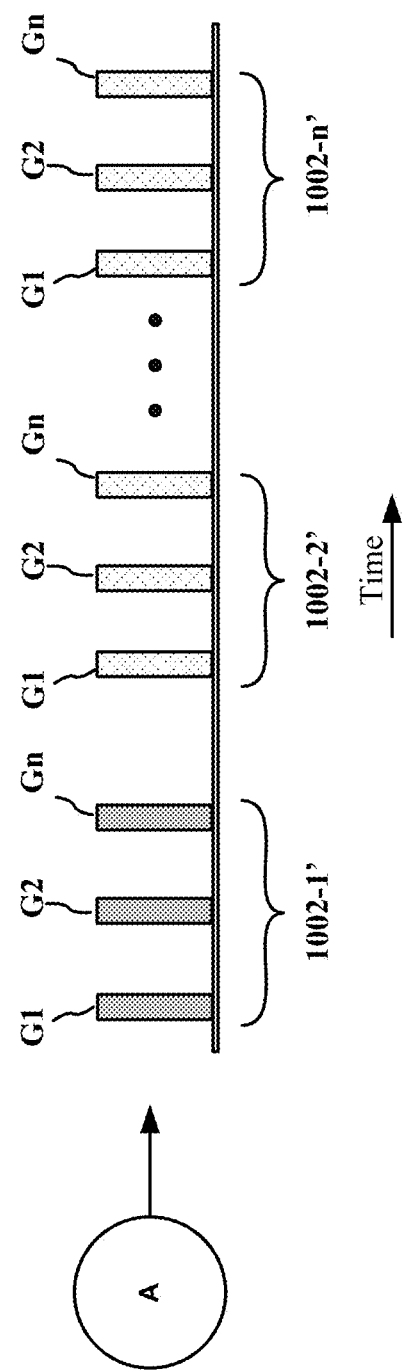

FIGS. 10A and 10B illustrate an example of one or more techniques described herein, such as use of the delay-Doppler domain to measure PTRS. The aspects shown in FIGS. 10A and 10B are similar to the aspects shown in FIG. 9, except that FIGS. 10A and 10B show an example of PTRS resource sample groups where each respective group includes a plurality of respective PTRS resource samples. For example, each respective group of PTRS resource samples may include two or more adjacent PTRS resource samples. FIGS. 10A and 10B illustrate an example where each group includes three adjacent PTRS resource samples along the delay axis. In other aspects, each group may include less than three adjacent PTRS resource samples. In other aspects, each group may include more than three adjacent PTRS resource samples.

In the aspect shown, FIG. 10A illustrates a grid 1010 having a Doppler axis and a Delay axis. Each cell in grid 1010 represents a type of sample. While FIG. 10A shows two types of samples (a first type of samples being PTRS resource samples and a second type of samples being data samples), other aspects may include one or more additional types of samples (e.g., DMRS samples or any other type of sample). The z-axis may be viewed as extending perpendicularly away from the figure. For example, a PTRS resource sample value of a first value extends in the z-direction, and a PTRS resource sample value of a second value more than the first value extends in the z-direction by more than the first value. In this way, the two-dimensional grid 1010 shows magnitude from a top view perspective due to the two-dimensional nature of the grid 1010. The magnitude of each respective PTRS resource sample may be represented by a complex number (e.g., a+bj, where "a" represents the real component and "b" represents the imaginary component).

The aspect shown in FIG. 10A illustrates a plurality of symbols 1002 in the delay-Doppler domain. The plurality of symbols 1002 are represented by 1002-1, 1002-2, 1002-3, 1002-4, 1002-5, and 1002-n, where 1002-n represents the nth symbol. In some aspects, the plurality of symbols 1002 may include two or more symbols even though the aspect shown in FIG. 10A shows 5 symbols and an nth symbol. For example, n may equal two or more in such aspects. Each respective symbol of the plurality of symbols 1002 may include one or more PTRS resource samples. Each PTRS resource sample may have a corresponding value.

Each respective symbol of the plurality of symbols 1002 may include one or more groups of adjacent PTRS resource samples. In some aspects, each group of adjacent PTRS resource samples may include two more adjacent PTRS resource samples along the delay axis. In the aspect of FIG. 10A, each group includes three adjacent PTRS resource samples along the delay axis. Each respective symbol includes its own respective data samples 1008. Similarly, each respective symbol includes one or more respective PTRS resource samples 1004. For example, symbol 1002-1 includes one or more PTRS resource samples 1004-1A-G1 (representing a first PTRS resource sample in a first group (G1) of adjacent PTRS resource samples of symbol 1002-1), 1004-2A-G1 (representing a second PTRS resource sample in the first group (G1) of adjacent PTRS resource samples of symbol 1002-1), 1004-3A-G1 (representing a third PTRS resource sample in the first group (G1) of adjacent PTRS resource samples of symbol 1002-1), 1004-4A-G2 (representing a fourth PTRS resource sample in a second group (G2) of adjacent PTRS resource samples of symbol 1002-1), 1004-5A-G2 (representing a fifth PTRS resource sample in the second group (G2) of adjacent PTRS resource samples of symbol 1002-1), 1004-6A-G2 (representing a sixth PTRS resource sample in the second group (G2) of adjacent PTRS resource samples of symbol 1002-1), 1004-7A-Gn (representing a seventh PTRS resource sample in an nth group (Gn) of adjacent PTRS resource samples of symbol 1002-1), 1004-8A-Gn (representing an eighth PTRS resource sample in the nth group (Gn) of adjacent PTRS resource samples of symbol 1002-1), and 1004-9A-Gn (representing a ninth PTRS resource sample in the nth group (Gn) of adjacent PTRS resource samples of symbol 1002-1). Similarly, symbol 1002-2 includes one or more PTRS resource samples 1004-1B-G1 (representing a first PTRS resource sample in a first group (G1) of adjacent PTRS resource samples of symbol 1002-2), 1004-2B-G1 (representing a second PTRS resource sample in the first group (G1) of adjacent PTRS resource samples of symbol 1002-2), 1004-3B-G1 (representing a third PTRS resource sample in the first group (G1) of adjacent PTRS resource samples of symbol 1002-2), 1004-4B-G2 (representing a fourth PTRS resource sample in a second group (G2) of adjacent PTRS resource samples of symbol 1002-2), 1004-5B-G2 (representing a fifth PTRS resource sample in the second group (G2) of adjacent PTRS resource samples of symbol 1002-2), 1004-6B-G2 (representing a sixth PTRS resource sample in the second group (G2) of adjacent PTRS resource samples of symbol 1002-2), 1004-7B-Gn (representing a seventh PTRS resource sample in an nth group (Gn) of adjacent PTRS resource samples of symbol 1002-2), 1004-8B-Gn (representing an eighth PTRS resource sample in the nth group (Gn) of adjacent PTRS resource samples of symbol 1002-2), and 1004-9B-Gn (representing a ninth PTRS resource sample in the nth group (Gn) of adjacent PTRS resource samples of symbol 1002-2). Similarly, symbol 1002-n includes one or more PTRS resource samples 1004-1F-G1 (representing a first PTRS resource sample in a first group (G1) of adjacent PTRS resource samples of symbol 1002-n), 1004-2F-G1 (representing a second PTRS resource sample in the first group (G1) of adjacent PTRS resource samples of symbol 1002-n), 1004-3F-G1 (representing a third PTRS resource sample in the first group (G1) of adjacent PTRS resource samples of symbol 1002-n), 1004-4F-G2 (representing a fourth PTRS resource sample in a second group (G2) of adjacent PTRS resource samples of symbol 1002-n), 1004-5F-G2 (representing a fifth PTRS resource sample in the second group (G2) of adjacent PTRS resource samples of symbol 1002-n), 1004-6F-G2 (representing a sixth PTRS resource sample in the second group (G2) of adjacent PTRS resource samples of symbol 1002-n), 1004-7F-Gn (representing a seventh PTRS resource sample in an nth group (Gn) of adjacent PTRS resource samples of symbol 1002-n), 1004-8F-Gn (representing an eighth PTRS resource sample in the nth group (Gn) of adjacent PTRS resource samples of symbol 1002-n), and 1004-9F-Gn (representing a ninth PTRS resource sample in the nth group (Gn) of adjacent PTRS resource samples of symbol 1002-n).

In the aspect shown in FIG. 10A, the respective groups of PTRS resource samples of each respective symbol are separated by at least one non-PTRS resource sample (e.g., data sample 1008). For example, the first group G1 of PTRS resource samples in symbol 1002-1 and the second group G2 of PTRS resource samples in symbol 1002-1 are separated by 5 data samples. In some aspects, m data samples may separate different groups of PTRS resource samples in each symbol. In the aspect of FIG. 10A, m is shown as equaling 5 (i.e., there are 5 data samples between the PTRS resource samples in each respective symbol of the plurality of symbols 1002). However, in other aspects, m may be an integer greater than or less than 5, such as 1, 2, 3, 4, 6, 7, 8, 9, 10, 11, 12, 13, 14, 15, or greater.

In the aspect shown in FIG. 10A, one or more groups of PTRS resource samples of one symbol may be adjacent along the Doppler axis to one or more groups of PTRS resource samples of one or more other symbols. For example, the first group G1 of PTRS resource samples in symbol 1002-1 is adjacent to the first group G1 of PTRS resource samples in symbol 1002-2. Similarly, the second group G2 of PTRS resource samples in symbol 1002-2 is adjacent to the second group G2 of PTRS resource samples in symbol 1002-1 and the second group G2 of PTRS resource samples in symbol 1002-3.

The network node may be configured to not modify the values of PTRS resource samples in the delay-Doppler domain corresponding to at least one symbol, and may be configured to modify the values of the one or more PTRS resource samples in the delay-Doppler domain corresponding to at least one symbol to be another value, such as zero. An unmodified value corresponding to a PTRS resource sample may be non-zero. A modified value corresponding to a PTRS resource sample may be zero or non-zero.

In the aspect shown in FIG. 10A, the first symbol 1002-1 is shown with unmodified or modified PTRS resource values, and the second symbol 1002-2 through the nth symbol 1002-n are shown as having modified PTRS resource values. In some aspects, the modified PTRS resource sample values may be zero. In other aspects, the modified PTRS resource sample values may be based on a sequence. In other aspects, the modified and the unmodified PTRS resource sample values may be based on a sequence, such as Zadoff Chu (ZC) sequence or a pseudo-random noise (PN) sequence. In some aspects, the PTRS resource sample values for the first symbol 1002-1 may be non-zero, and the PTRS resource sample values for any other symbol may be zero.

The plurality of symbols 1002 and the respective PTRS resource samples 1004 corresponding thereto are respectively converted or transformed into the plurality of symbols 1002' and the respective PTRS resource samples 1004' corresponding thereto in the time domain. For example, the network node may be configured to apply an inverse ZAC transform on the plurality of symbols 1002 shown in grid 1010 in FIG. 10A to transform them into the plurality of symbols 1002' in the time domain shown in FIG. 10B. For example, symbol 1002-1 in the delay-Doppler domain corresponds to symbol 1002-1' in the time domain. Similarly, the first group G1 of PTRS resource samples of symbol 1002-1 in the delay-Doppler domain respectively corresponds to the first group G1' of PTRS resource samples of symbol 1002-1' in the time domain. As another example, the nth group Gn of PTRS resource samples of symbol 1002-n in the delay-Doppler domain respectively corresponds to the nth group Gn' of PTRS resource samples of symbol 1002-n' in the time domain.

Figure 11A:
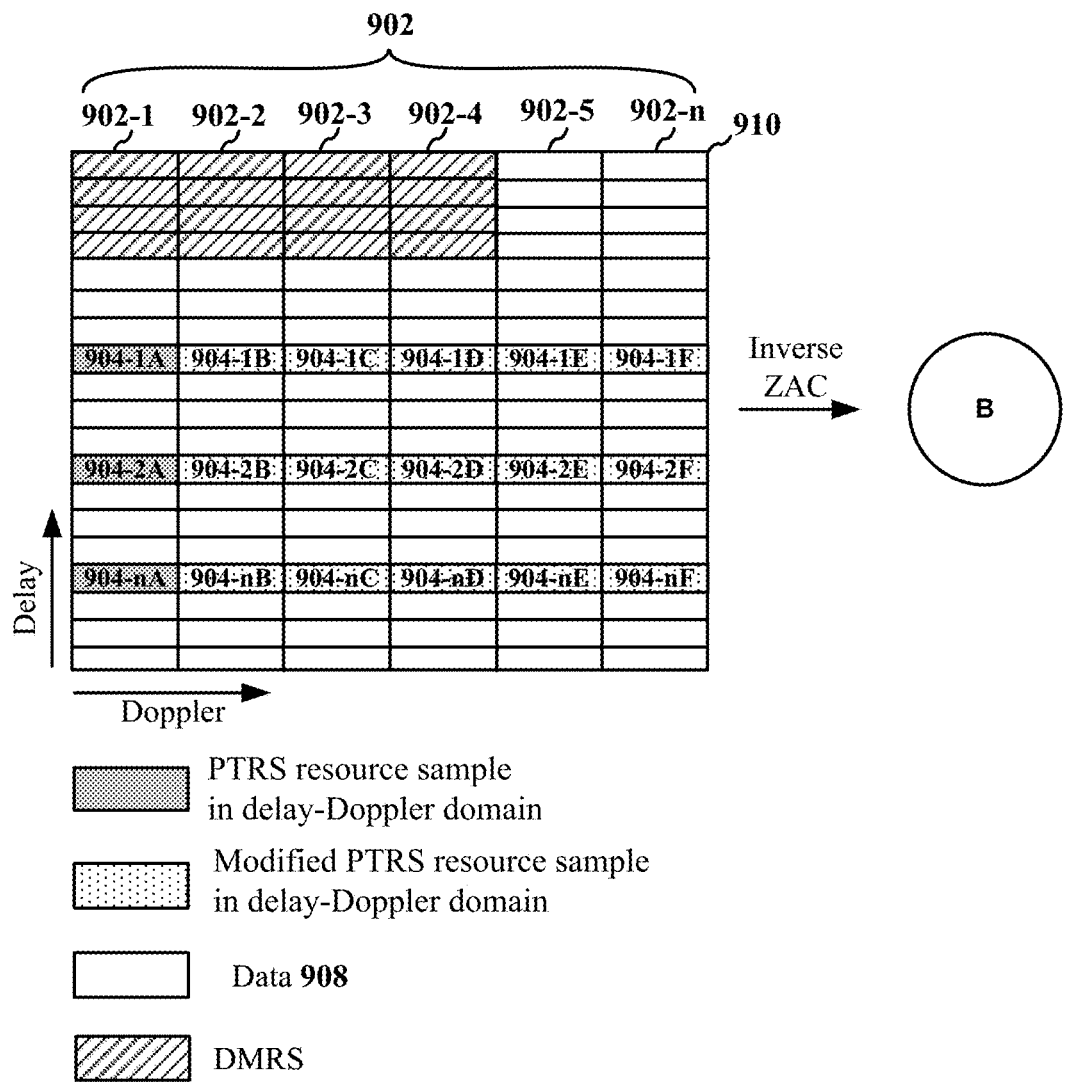
FIGS. 11A and 11B illustrate an example of a PTRS in relation to a DMRS.
Figure 11B:
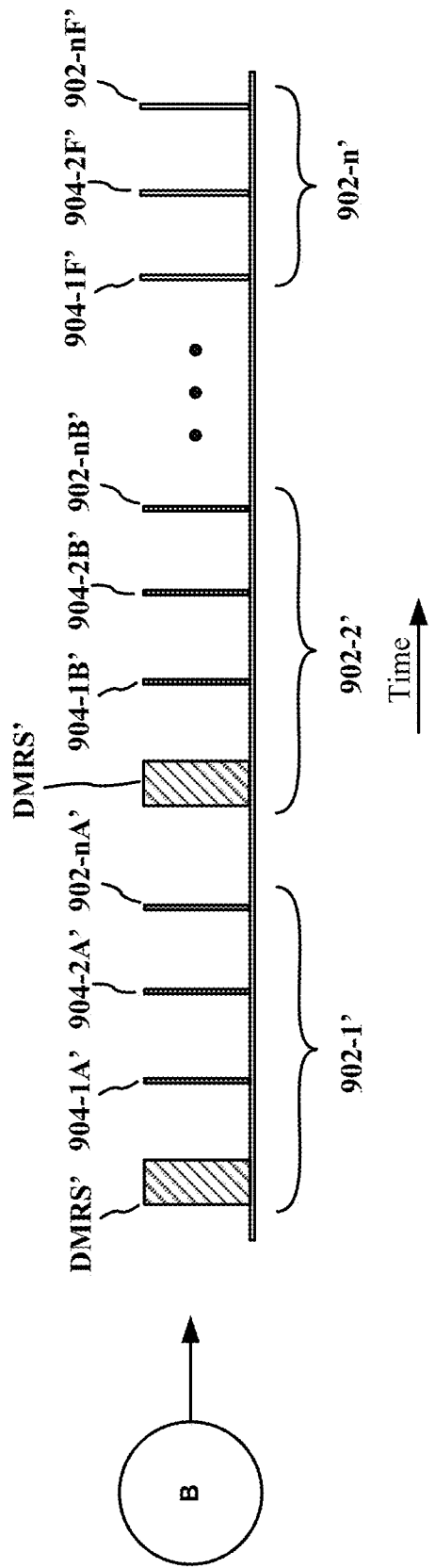

FIGS. 11A and 11B illustrate an example of a PTRS in relation to a DMRS in a different aspect of FIG. 9. As shown in FIG. 11A, one or symbols 902 may include one or more DMRS samples. For example, symbol 902-1 includes four adjacent DMRS samples, symbol 902-2 includes four adjacent DMRS samples, symbol 902-3 includes four adjacent DMRS samples, and symbol 902-4 includes four adjacent DMRS samples. In some aspects, the DMRS may be spaced a first number of samples (e.g., data samples) from a PTRS resource sample, and PTRS resource samples may be spaced a second number of samples (e.g., data samples) from other PTRS resource samples. In some aspects, the first number of samples may be equal to the second number of samples to increase performance. In other aspects, the first number of samples may be unequal to the second number of samples. In the aspect shown in FIG. 11A, the first number of samples and the second number of samples equal 3 samples. In other aspects, the first number of samples and the second number of samples may be less than 3 or greater than 3. In some aspects, the DMRS may be placed in the delay-Doppler domain with a delay width approximately 2 times the maximum delay spread and Doppler width approximately 2 times the Doppler spread. The OTFS channel estimation may include the phase noise component at such time instances, due to the DMRS structure.

For phase noise estimation, after the channel estimation and equalization in the delay-Doppler domain, an IFFT having a dimension equal to the Doppler for each of the estimated sample vectors at the PTRS positions in the delay-Doppler domain may be applied. The IFFT may transform the PTRS samples to the time domain. With the PTRS samples in the time domain, the phase noise may be estimated based on the PTRS samples. In some aspects, such as for grouped PTRS samples, the phase noise may be estimated from the average over the PTRS samples. Phase noise for other time samples may be estimated by interpolating over PTRS samples in the time domain.

For phase noise compensation, after the channel equalization, the estimated data samples in the delay-Doppler domain may be converted to the time domain. The application of the phase noise compensation may be performed in the time domain, followed by converting the time domain samples back to the delay-Doppler domain.

In some aspects, the density of the PTRS in the delay-Doppler domain may be selected based on at least one of the MCS, the number of RBs, or phase noise. In some aspects, the density of the PTRS may be selected by a base station. In some aspects, a UE may be configured to indicate to the base station the highest density of PTRS that the UE may be able to process. The base station may transmit the density of PTRS either explicitly or implicitly based on the MCS and the number of transmitted RB s through DCI.

Figure 12:
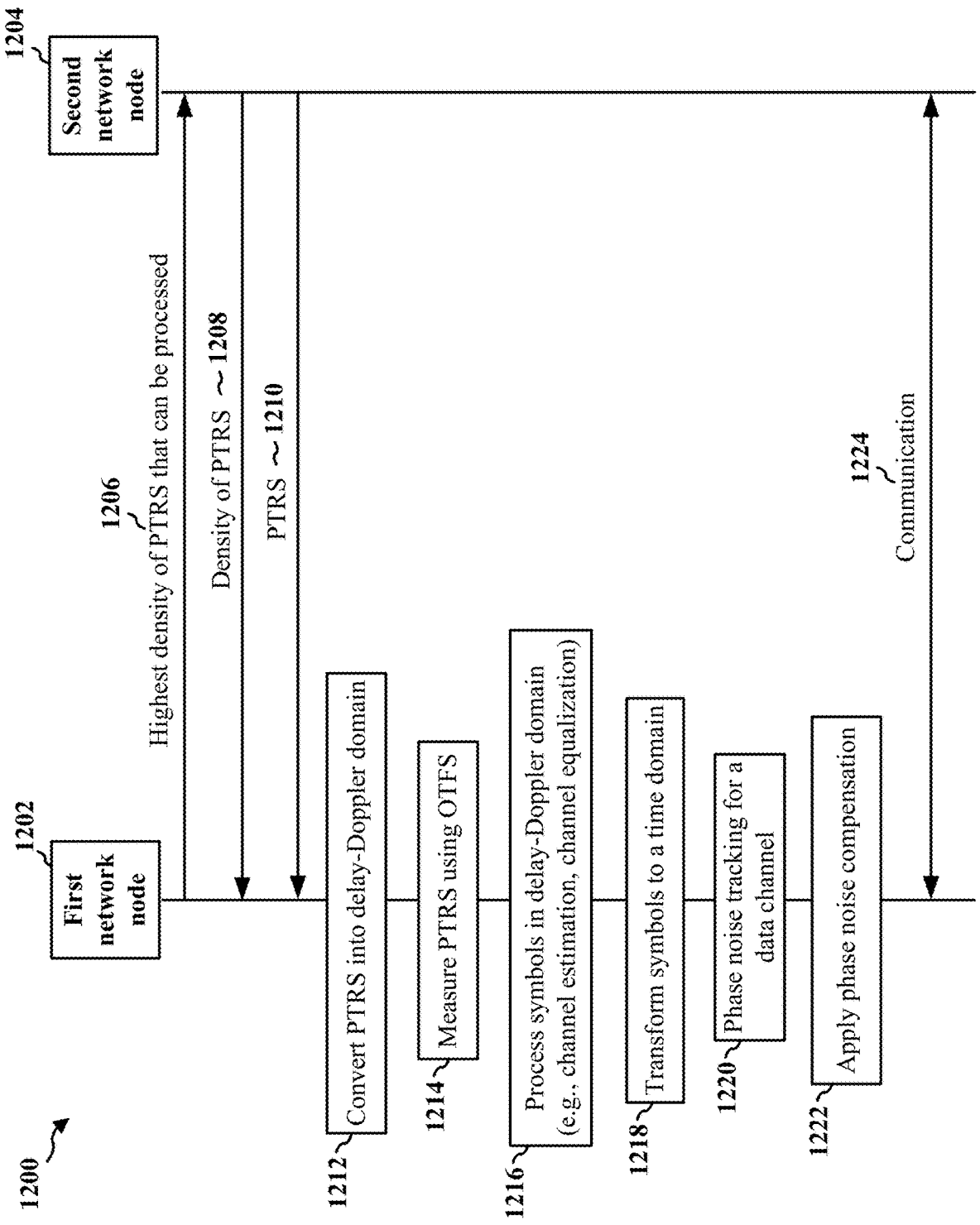
FIG. 12 is a call flow diagram of signaling between a first network node and a second network node.

FIG. 12 is a call flow diagram 1200 of signaling between a first network node 1202 and a second network node 1204. In some aspects, the first network node 1202 or the second network node may comprise a UE or a base station. In some aspects, the second network node 1204 (e.g., base station) may be configured to provide at least one cell. In some aspects, the first network node 1202 (e.g., UE) may be configured to communicate with the second network node 1204 (e.g., base station). For example, in the context of FIG. 1, the second network node 1204 (e.g., base station) may correspond to base station 102/180 and, accordingly, the cell may include a geographic coverage area 110 in which communication coverage is provided and/or small cell 102' having a coverage area 110'. Further, a first network node 1202 (e.g., UE) may correspond to at least UE 104. In another example, in the context of FIG. 3, the second network node 1204 (e.g., base station) may correspond to base station 310 and the first network node 1202 (e.g., UE) may correspond to UE 350.

As illustrated at 1206, the first network node 1202 may transmit information indicating a highest density PTRS that the first network node may process to the second network node 1204. The second network node 1204 may receive the information indicating the highest density PTRS that the first network node may process from the first network node 1202. The PTRS included in the OTFS may be based on the information transmitted. In some aspects, the second network node may comprise a UE, a base station, an apparatus, a device, or a computing system configured to perform any techniques described herein. In some aspects, the information may be transmitted in uplink control information (UCI).

As illustrated at 1208, the second network node 1204 may transmit information indicating a density of the PTRS to the first network node 1202. The first network node 1202 may receive the information indicating the density of the PTRS from the second network node 1204. The PTRS may be measured based on the information received from the second network node. In some aspects, the information is received in downlink control information (DCI).

As illustrated at 1210, the second network node 1204 may transmit the PTRS to the first network node 1202. The first network node 1202 may receive the PTRS from the second network node 1204.

As illustrated at 1212, the first network node 1202 may convert the PTRS. The first network node may convert the PTRS into the delay-Doppler domain of the OTFS.

As illustrated at 1214, the first network node 1202 may measure a PTRS using an OTFS including a delay-Doppler domain, for example as disclosed in FIGS. 9-11. The OTFS may include a plurality of symbols in the delay-Doppler domain based on the PTRS. A first symbol of the plurality of symbols may include a first PTRS resource sample having a first value in the delay-Doppler domain. A second symbol of the plurality of symbols may include a second PTRS resource sample having a second value in the delay-Doppler domain. The first PTRS resource sample may be adjacent to the second PTRS resource sample.

The first value or the second value may comprise a complex number comprising a real component and an imaginary component. In some instances, the imaginary component may have a value of zero (0), while the real component may have a value greater than zero (0). In some instances, at least one of the imaginary component or the real component may have a non-zero value. In some aspects, the first value and the second value may be based on a sequence. The sequence may include a Zadoff Chu (ZC) sequence or a pseudo-random noise (PN) sequence. In some aspects, the first value of the first PTRS resource sample may be non-zero and the second value of the second PTRS resource sample may be zero.

The first symbol may include a first plurality of PTRS resource samples in the delay-Doppler domain. Each respective PTRS resource sample of the first plurality of PTRS resource samples may have a respective value. In some aspects, the first plurality of PTRS resource samples may include the first PTRS resource sample. In some aspects, the second symbol may include a second plurality of PTRS resource samples in the delay-Doppler domain. Each respective PTRS resource sample of the second plurality of PTRS resource samples may have a respective value. The second plurality of PTRS resource samples may include the second PTRS resource sample. In some aspects, the respective value may be non-zero for each respective PTRS resource sample in the first plurality of PTRS resource samples. For example, the first and second values may be non-zero and zero, respectively. In some aspects, the respective value may be zero for each respective PTRS resource sample in the second plurality of PTRS resource samples. In some aspects, the respective value for each respective PTRS resource sample in the first plurality of PTRS resource samples may be based on a sequence. In some aspects, the respective value for each respective PTRS resource sample in the second plurality of PTRS resource samples may be based on the sequence.

The first symbol may include a first plurality of PTRS resource samples in the delay-Doppler domain. Each respective PTRS resource sample of the first plurality of PTRS resource samples may have a respective value. In some aspects, the first plurality of PTRS resource samples may include the first PTRS resource sample. Each respective symbol of the plurality of symbols that is different from the first symbol may include a respective plurality of PTRS resource samples in the delay-Doppler domain. Each respective PTRS resource sample of each respective symbol that is different from the first symbol may have a respective value. In some aspects, the respective value may be non-zero for each respective PTRS resource sample in the first plurality of PTRS resource samples. In some aspects, the respective value may be zero for each respective PTRS resource sample of each respective symbol that is different from the first symbol. In some aspects, the respective value for each respective PTRS resource sample in the first plurality of PTRS resource samples may be based on a sequence. In some aspects, the respective value for each respective PTRS resource sample of each respective symbol that is different from the first symbol may be based on the sequence.

The first symbol may include a first plurality of PTRS resource samples spaced apart along a delay axis in the delay-Doppler domain. In some aspects, the first plurality of PTRS resource samples may include the first PTRS resource sample. In some aspects, the second symbol may include a second plurality of PTRS resource samples spaced apart along the delay axis in the delay-Doppler domain. The second plurality of PTRS resource samples may include the second PTRS resource sample. In some aspects, the PTRS resource samples of the first plurality of PTRS resource samples may be spaced apart along the delay axis in the delay-Doppler domain by n delay-Doppler domain samples, where n may be an integer greater than zero. In some aspects, the PTRS resource samples of the second plurality of PTRS resource samples may be spaced apart along the delay axis in the delay-Doppler domain by n delay-Doppler domain samples, where n may be an integer greater than zero. In some aspects, the n delay-Doppler domain samples may be data samples in the delay-Doppler domain.

The first symbol may include a first plurality of PTRS resource samples that are adjacent along a delay axis in the delay-Doppler domain and a second plurality of PTRS resource samples that are adjacent along the delay axis in the delay-Doppler domain. The first plurality and second plurality of PTRS resource samples of the first symbol may be spaced apart along the delay axis in the delay-Doppler domain by n delay-Doppler domain samples. The second symbol may include a first plurality of PTRS resource samples that are adjacent along the delay axis in the delay-Doppler domain and a second plurality of PTRS resource samples that are adjacent along the delay axis in the delay-Doppler domain. The first plurality and second plurality of PTRS resource samples of the second symbol may be spaced apart along the delay axis in the delay-Doppler domain by n delay-Doppler domain samples, where n is an integer greater than zero. In some aspects, one of the first plurality or the second plurality of PTRS resource samples of the first symbol may include the first PTRS resource sample. In some aspects, one of the first plurality or the second plurality of PTRS resource samples of the second symbol may include the second PTRS resource sample. In some aspects, the first plurality and second plurality of PTRS resource samples of the first symbol may each include m adjacent PTRS resource samples, where m is an integer greater than zero. In some aspects, the first plurality and second plurality of PTRS resource samples of the second symbol may each includes m adjacent PTRS resource samples, where m is an integer greater than zero.

The first symbol may include a first plurality of demodulation reference signal (DMRS) samples. The second symbol may include a second plurality of DMRS samples. In some aspects, the first plurality of DMRS samples may be adjacent to the second plurality of DMRS samples in the delay-Doppler domain.

The first PTRS resource sample may be comprised within a first set of PTRS resource samples and the second PTRS resource sample may be comprised within a second set of PTRS resource samples. In some aspects, the first set of PTRS resource samples may be adjacent to the second set of PTRS resource samples. Each of the first and second sets of PTRS resource samples may include m adjacent PTRS resource samples along a delay axis in the delay-Doppler domain. In some aspects, the first set of PTRS resource samples may include at least two PTRS resource samples that are spaced apart along the delay axis by n delay-Doppler domain samples. For example, the second set of PTRS resource samples may include at least two PTRS resource samples that are spaced apart along the delay axis by n delay-Doppler domain samples, where m is an integer greater than zero, and n is an integer greater than zero. In some aspects, at least one of m or n may be a function of at least one of a modulation and coding scheme (MCS) for the PTRS, a number of resources blocks (RBs) including the PTRS capable of being processed by the first network node, or a phase noise at the first network node. In some aspects, at least one of m or n may be proportionally related to the at least one of the MCS for the PTRS, the number of RBs including the PTRS capable of being processed by the network node (e.g., UE), or the phase noise at the network node (e.g., UE). In some aspects, the OTFS may further include a plurality of demodulation reference signal (DMRS) samples that are adjacent along the delay axis and a Doppler axis in the delay-Doppler domain. The first symbol may include at least one DMRS sample of the first set of DMRS samples and the second symbol may include at least one DMRS sample of the first set of DMRS samples. In some aspects, the first set of PTRS resource samples and the second set of PTRS resource samples, closest to the first set of DMRS samples, may be spaced apart from the plurality of DMRS samples by n doppler-domain samples or by z doppler-Domain samples, where z is different from n and is an integer greater than zero. The z PTRS resource samples may be along the delay axis.

As illustrated at 1216, the first network node 1202 may process the plurality of symbols in the delay-Doppler domain. The first network node may process the plurality of symbols in the delay-Doppler domain by performing at least one of channel estimation or channel equalization on the plurality of symbols in the delay-Doppler domain, for example as disclosed in FIGS. 11A and 11B.

As illustrated at 1218, the first network node 1202 may transform the plurality of symbols, for example as disclosed in FIGS. 9-11. In some aspects, the first network node may transform the plurality of symbols from the delay-Doppler domain to a time domain. In some aspects, the first network node may transform the processed plurality of symbols to a time domain. The PTRS may be measured based on the transformed symbols in the time domain.

As illustrated at 1220, the first network node 1202 may perform phase noise tracking for a data channel, for example as disclosed in FIGS. 9-11. The first network node may perform the phase noise tracking for the data channel based on the measured PTRS.

As illustrated at 1222, the first network node 1202 may apply phase noise compensation on the transformed symbols in the time domain, for example as disclosed in FIGS. 11A and 11B. The first network node may apply the phase noise compensation on the transformed symbols in the time domain to perform the phase noise tracking for the data channel based on the measured PTRS. In some aspects, to perform the phase noise tracking for the data channel based on the measured PTRS, the first network node may convert the time domain samples back to the delay-Doppler domain of the OTFS. The first network node 1202, at 1224, may communicate with the second network node 1204.

Figure 13:
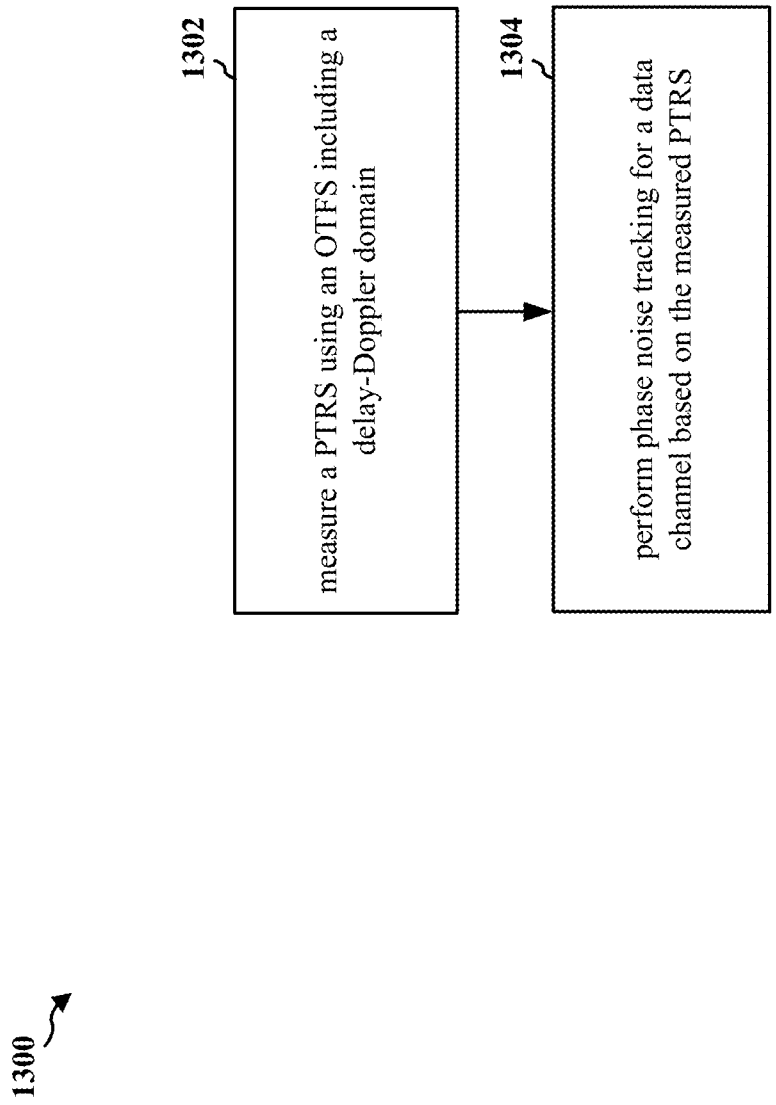
FIG. 13 is a flowchart of a method of wireless communication.

FIG. 13 is a flowchart 1300 of a method of wireless communication performed by a first network node. In some aspects, the first network node may comprise a UE, a base station, an apparatus, a device, or a computing system configured to perform any techniques described herein. In some aspects, the method may be performed by a UE or a component of a UE (e.g., the UE 104; the apparatus 1502; the baseband processor 1504, which may include the memory 360 and which may be the entire UE 350 or a component of the UE 350, such as the TX processor 368, the RX processor 356, and/or the controller/processor 359). In some aspects, the method may be performed by a base station or a component of a base station (e.g., the base station 102/180; the apparatus 1502; the baseband processor 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous.

At 1302, the first network node may measure a PTRS using an OTFS including a delay-Doppler domain, for example as disclosed in FIGS. 9-11. For example, 1302 may be performed by PTRS component 1540 of apparatus 1502. The OTFS may include a plurality of symbols in the delay-Doppler domain based on the PTRS. A first symbol of the plurality of symbols may include a first PTRS resource sample having a first value in the delay-Doppler domain. A second symbol of the plurality of symbols may include a second PTRS resource sample having a second value in the delay-Doppler domain. The first PTRS resource sample may be adjacent to the second PTRS resource sample.

The first value or the second value may comprise a complex number comprising a real component and an imaginary component. In some instances, the imaginary component may have a value of zero (0), while the real component may have a value greater than zero (0). In some instances, at least one of the imaginary component or the real component may have a non-zero value. In some aspects, the first value and the second value may be based on a sequence. The sequence may include a Zadoff Chu (ZC) sequence or a pseudo-random noise (PN) sequence. In some aspects, the first value of the first PTRS resource sample may be non-zero and the second value of the second PTRS resource sample may be zero.

The first symbol may include a first plurality of PTRS resource samples in the delay-Doppler domain. Each respective PTRS resource sample of the first plurality of PTRS resource samples may have a respective value. In some aspects, the first plurality of PTRS resource samples may include the first PTRS resource sample. In some aspects, the second symbol may include a second plurality of PTRS resource samples in the delay-Doppler domain. Each respective PTRS resource sample of the second plurality of PTRS resource samples may have a respective value. The second plurality of PTRS resource samples may include the second PTRS resource sample. In some aspects, the respective value may be non-zero for each respective PTRS resource sample in the first plurality of PTRS resource samples. For example, the first and second values may be non-zero and zero, respectively. In some aspects, the respective value may be zero for each respective PTRS resource sample in the second plurality of PTRS resource samples. In some aspects, the respective value for each respective PTRS resource sample in the first plurality of PTRS resource samples may be based on a sequence. In some aspects, the respective value for each respective PTRS resource sample in the second plurality of PTRS resource samples may be based on the sequence.

The first symbol may include a first plurality of PTRS resource samples in the delay-Doppler domain. Each respective PTRS resource sample of the first plurality of PTRS resource samples may have a respective value. In some aspects, the first plurality of PTRS resource samples may include the first PTRS resource sample. Each respective symbol of the plurality of symbols that is different from the first symbol may include a respective plurality of PTRS resource samples in the delay-Doppler domain. Each respective PTRS resource sample of each respective symbol that is different from the first symbol may have a respective value. In some aspects, the respective value may be non-zero for each respective PTRS resource sample in the first plurality of PTRS resource samples. In some aspects, the respective value may be zero for each respective PTRS resource sample of each respective symbol that is different from the first symbol. In some aspects, the respective value for each respective PTRS resource sample in the first plurality of PTRS resource samples may be based on a sequence. In some aspects, the respective value for each respective PTRS resource sample of each respective symbol that is different from the first symbol may be based on the sequence.

The first symbol may include a first plurality of PTRS resource samples spaced apart along a delay axis in the delay-Doppler domain. In some aspects, the first plurality of PTRS resource samples may include the first PTRS resource sample. In some aspects, the second symbol may include a second plurality of PTRS resource samples spaced apart along the delay axis in the delay-Doppler domain. The second plurality of PTRS resource samples may include the second PTRS resource sample. In some aspects, the PTRS resource samples of the first plurality of PTRS resource samples may be spaced apart along the delay axis in the delay-Doppler domain by n delay-Doppler domain samples, where n may be an integer greater than zero. In some aspects, the PTRS resource samples of the second plurality of PTRS resource samples may be spaced apart along the delay axis in the delay-Doppler domain by n delay-Doppler domain samples, where n may be an integer greater than zero. In some aspects, the n delay-Doppler domain samples may be data samples in the delay-Doppler domain.

The first symbol may include a first plurality of PTRS resource samples that are adjacent along a delay axis in the delay-Doppler domain and a second plurality of PTRS resource samples that are adjacent along the delay axis in the delay-Doppler domain. The first plurality and second plurality of PTRS resource samples of the first symbol may be spaced apart along the delay axis in the delay-Doppler domain by n delay-Doppler domain samples. The second symbol may include a first plurality of PTRS resource samples that are adjacent along the delay axis in the delay-Doppler domain and a second plurality of PTRS resource samples that are adjacent along the delay axis in the delay-Doppler domain. The first plurality and second plurality of PTRS resource samples of the second symbol may be spaced apart along the delay axis in the delay-Doppler domain by n delay-Doppler domain samples, where n is an integer greater than zero. In some aspects, one of the first plurality or the second plurality of PTRS resource samples of the first symbol may include the first PTRS resource sample. In some aspects, one of the first plurality or the second plurality of PTRS resource samples of the second symbol may include the second PTRS resource sample. In some aspects, the first plurality and second plurality of PTRS resource samples of the first symbol may each include m adjacent PTRS resource samples, where m is an integer greater than zero. In some aspects, the first plurality and second plurality of PTRS resource samples of the second symbol may each includes m adjacent PTRS resource samples, where m is an integer greater than zero.

The first symbol may include a first plurality of demodulation reference signal (DMRS) samples. The second symbol may include a second plurality of DMRS samples. In some aspects, the first plurality of DMRS samples may be adjacent to the second plurality of DMRS samples in the delay-Doppler domain.

The first PTRS resource sample may be comprised within a first set of PTRS resource samples and the second PTRS resource sample may be comprised within a second set of PTRS resource samples. In some aspects, the first set of PTRS resource samples may be adjacent to the second set of PTRS resource samples. Each of the first and second sets of PTRS resource samples may include m adjacent PTRS resource samples along a delay axis in the delay-Doppler domain. In some aspects, the first set of PTRS resource samples may include at least two PTRS resource samples that are spaced apart along the delay axis by n delay-Doppler domain samples. For example, the second set of PTRS resource samples may include at least two PTRS resource samples that are spaced apart along the delay axis by n delay-Doppler domain samples, where m is an integer greater than zero, and n is an integer greater than zero. In some aspects, at least one of m or n may be a function of at least one of a modulation and coding scheme (MCS) for the PTRS, a number of resources blocks (RBs) including the PTRS capable of being processed by the first network node, or a phase noise at the first network node. In some aspects, at least one of m or n may be proportionally related to the at least one of the MCS for the PTRS, the number of RBs including the PTRS capable of being processed by the network node (e.g., UE), or the phase noise at the network node (e.g., UE). In some aspects, the OTFS may further include a plurality of demodulation reference signal (DMRS) samples that are adjacent along the delay axis and a Doppler axis in the delay-Doppler domain. The first symbol may include at least one DMRS sample of the first set of DMRS samples and the second symbol may include at least one DMRS sample of the first set of DMRS samples. In some aspects, the first set of PTRS resource samples and the second set of PTRS resource samples, closest to the first set of DMRS samples, may be spaced apart from the plurality of DMRS samples by n doppler-domain samples or by z doppler-Domain samples, where z is different from n and is an integer greater than zero. The z PTRS resource samples may be along the delay axis.

At 1304, the first network node may perform phase noise tracking for a data channel, for example as disclosed in FIGS. 9-11. For example, 1304 may be performed by phase noise component 1546 of apparatus 1502. The first network node may perform the phase noise tracking for the data channel based on the measured PTRS.

Figure 14:
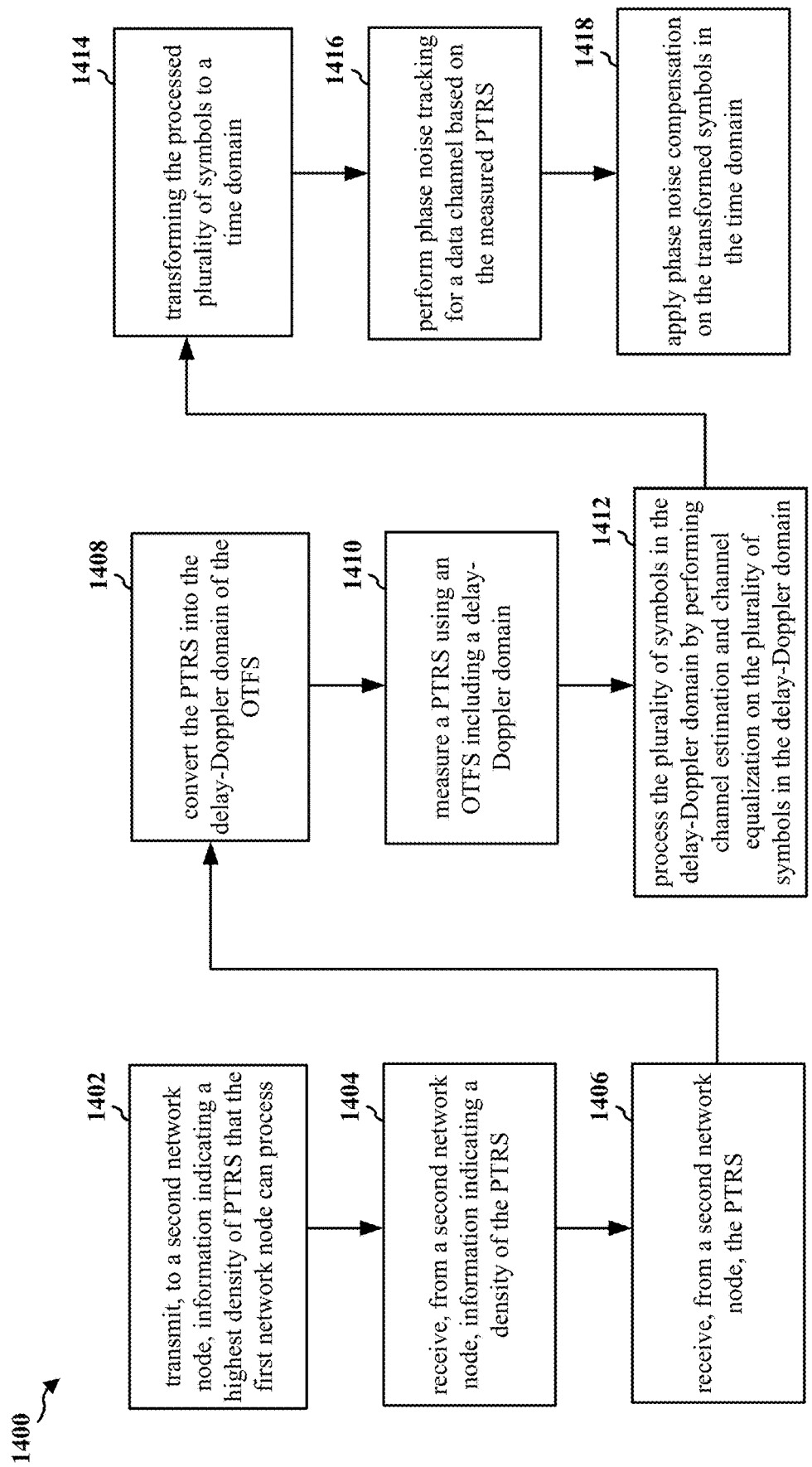
FIG. 14 is a flowchart of a method of wireless communication.

FIG. 14 is a flowchart 1400 of a method of wireless communication performed by a first network node. In some aspects, the first network node may comprise a UE, a base station, an apparatus, a device, or a computing system configured to perform any techniques described herein. In some aspects, the method may be performed by a UE or a component of a UE (e.g., the UE 104; the apparatus 1502; the baseband processor 1504, which may include the memory 360 and which may be the entire UE 350 or a component of the UE 350, such as the TX processor 368, the RX processor 356, and/or the controller/processor 359). In some aspects, the method may be performed by a base station or a component of a base station (e.g., the base station 102/180; the apparatus 1502; the baseband processor 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous.

At 1402, the first network node may transmit information indicating a highest density PTRS that the first network node may process. For example, 1402 may be performed by PTRS component 1540 of apparatus 1502. The first network node may transmit the information indicating the highest density PTRS that the first network node may process to a second network node. The PTRS included in the OTFS may be based on the information transmitted. In some aspects, the second network node may comprise a UE, a base station, an apparatus, a device, or a computing system configured to perform any techniques described herein. In some aspects, the information may be transmitted in UCI.

At 1404, the first network node may receive information indicating a density of the PTRS. For example, 1404 may be performed by PTRS component 1540 of apparatus 1502. The first network node may receive the information indicating the density of the PTRS from a second network node. The PTRS may be measured based on the information received from the second network node. In some aspects, the information is received in DCI.

At 1406, the first network node may receive the PTRS. For example, 1406 may be performed by PTRS component 1540 of apparatus 1502. The first network node may receive the PTRS from the second network node.

At 1408, the first network node may convert the PTRS. For example, 1408 may be performed by PTRS component 1540 of apparatus 1502. The first network node may convert the PTRS into the delay-Doppler domain of the OTFS.

At 1410, the first network node may measure a PTRS using an OTFS including a delay-Doppler domain, for example as disclosed in FIGS. 9-11. For example, 1410 may be performed by PTRS component 1540 of apparatus 1502. The OTFS may include a plurality of symbols in the delay-Doppler domain based on the PTRS. A first symbol of the plurality of symbols may include a first PTRS resource sample having a first value in the delay-Doppler domain. A second symbol of the plurality of symbols may include a second PTRS resource sample having a second value in the delay-Doppler domain. The first PTRS resource sample may be adjacent to the second PTRS resource sample.

The first value or the second value may comprise a complex number comprising a real component and an imaginary component. In some instances, the imaginary component may have a value of zero (0), while the real component may have a value greater than zero (0). In some instances, at least one of the imaginary component or the real component may have a non-zero value. In some aspects, the first value and the second value may be based on a sequence. The sequence may include a ZC sequence or a PN sequence. In some aspects, the first value of the first PTRS resource sample may be non-zero and the second value of the second PTRS resource sample may be zero.

The first symbol may include a first plurality of PTRS resource samples in the delay-Doppler domain. Each respective PTRS resource sample of the first plurality of PTRS resource samples may have a respective value. In some aspects, the first plurality of PTRS resource samples may include the first PTRS resource sample. In some aspects, the second symbol may include a second plurality of PTRS resource samples in the delay-Doppler domain. Each respective PTRS resource sample of the second plurality of PTRS resource samples may have a respective value. The second plurality of PTRS resource samples may include the second PTRS resource sample. In some aspects, the respective value may be non-zero for each respective PTRS resource sample in the first plurality of PTRS resource samples. For example, the first and second values may be non-zero and zero, respectively. In some aspects, the respective value may be zero for each respective PTRS resource sample in the second plurality of PTRS resource samples. In some aspects, the respective value for each respective PTRS resource sample in the first plurality of PTRS resource samples may be based on a sequence. In some aspects, the respective value for each respective PTRS resource sample in the second plurality of PTRS resource samples may be based on the sequence.

The first symbol may include a first plurality of PTRS resource samples in the delay-Doppler domain. Each respective PTRS resource sample of the first plurality of PTRS resource samples may have a respective value. In some aspects, the first plurality of PTRS resource samples may include the first PTRS resource sample. Each respective symbol of the plurality of symbols that is different from the first symbol may include a respective plurality of PTRS resource samples in the delay-Doppler domain. Each respective PTRS resource sample of each respective symbol that is different from the first symbol may have a respective value. In some aspects, the respective value may be non-zero for each respective PTRS resource sample in the first plurality of PTRS resource samples. In some aspects, the respective value may be zero for each respective PTRS resource sample of each respective symbol that is different from the first symbol. In some aspects, the respective value for each respective PTRS resource sample in the first plurality of PTRS resource samples may be based on a sequence. In some aspects, the respective value for each respective PTRS resource sample of each respective symbol that is different from the first symbol may be based on the sequence.

The first symbol may include a first plurality of PTRS resource samples spaced apart along a delay axis in the delay-Doppler domain. In some aspects, the first plurality of PTRS resource samples may include the first PTRS resource sample. In some aspects, the second symbol may include a second plurality of PTRS resource samples spaced apart along the delay axis in the delay-Doppler domain. The second plurality of PTRS resource samples may include the second PTRS resource sample. In some aspects, the PTRS resource samples of the first plurality of PTRS resource samples may be spaced apart along the delay axis in the delay-Doppler domain by n delay-Doppler domain samples, where n may be an integer greater than zero. In some aspects, the PTRS resource samples of the second plurality of PTRS resource samples may be spaced apart along the delay axis in the delay-Doppler domain by n delay-Doppler domain samples, where n may be an integer greater than zero. In some aspects, the n delay-Doppler domain samples may be data samples in the delay-Doppler domain.

The first symbol may include a first plurality of PTRS resource samples that are adjacent along a delay axis in the delay-Doppler domain and a second plurality of PTRS resource samples that are adjacent along the delay axis in the delay-Doppler domain. The first plurality and second plurality of PTRS resource samples of the first symbol may be spaced apart along the delay axis in the delay-Doppler domain by n delay-Doppler domain samples. The second symbol may include a first plurality of PTRS resource samples that are adjacent along the delay axis in the delay-Doppler domain and a second plurality of PTRS resource samples that are adjacent along the delay axis in the delay-Doppler domain. The first plurality and second plurality of PTRS resource samples of the second symbol may be spaced apart along the delay axis in the delay-Doppler domain by n delay-Doppler domain samples, where n is an integer greater than zero. In some aspects, one of the first plurality or the second plurality of PTRS resource samples of the first symbol may include the first PTRS resource sample. In some aspects, one of the first plurality or the second plurality of PTRS resource samples of the second symbol may include the second PTRS resource sample. In some aspects, the first plurality and second plurality of PTRS resource samples of the first symbol may each include m adjacent PTRS resource samples, where m is an integer greater than zero. In some aspects, the first plurality and second plurality of PTRS resource samples of the second symbol may each includes m adjacent PTRS resource samples, where m is an integer greater than zero.

The first symbol may include a first plurality of DMRS samples. The second symbol may include a second plurality of DMRS samples. In some aspects, the first plurality of DMRS samples may be adjacent to the second plurality of DMRS samples in the delay-Doppler domain.

The first PTRS resource sample may be comprised within a first set of PTRS resource samples and the second PTRS resource sample may be comprised within a second set of PTRS resource samples. In some aspects, the first set of PTRS resource samples may be adjacent to the second set of PTRS resource samples. Each of the first and second sets of PTRS resource samples may include m adjacent PTRS resource samples along a delay axis in the delay-Doppler domain. In some aspects, the first set of PTRS resource samples may include at least two PTRS resource samples that are spaced apart along the delay axis by n delay-Doppler domain samples. For example, the second set of PTRS resource samples may include at least two PTRS resource samples that are spaced apart along the delay axis by n delay-Doppler domain samples, where m is an integer greater than zero, and n is an integer greater than zero. In some aspects, at least one of m or n may be a function of at least one of an MCS for the PTRS, a number of RBs including the PTRS capable of being processed by the first network node, or a phase noise at the first network node. In some aspects, at least one of m or n may be proportionally related to the at least one of the MCS for the PTRS, the number of RBs including the PTRS capable of being processed by the network node (e.g., UE), or the phase noise at the network node (e.g., UE). In some aspects, the OTFS may further include a plurality of DMRS samples that are adjacent along the delay axis and a Doppler axis in the delay-Doppler domain. The first symbol may include at least one DMRS sample of the first set of DMRS samples and the second symbol may include at least one DMRS sample of the first set of DMRS samples. In some aspects, the first set of PTRS resource samples and the second set of PTRS resource samples, closest to the first set of DMRS samples, may be spaced apart from the plurality of DMRS samples by n doppler-domain samples or by z doppler-Domain samples, where z is different from n and is an integer greater than zero. The z PTRS resource samples may be along the delay axis.

At 1412, the first network node may process the plurality of symbols in the delay-Doppler domain. For example, 1412 may be performed by process component 1542 of apparatus 1502. The first network node may process the plurality of symbols in the delay-Doppler domain by performing channel estimation and channel equalization on the plurality of symbols in the delay-Doppler domain, for example as disclosed in FIGS. 11A and 11B.

At 1414, the first network node may transform the plurality of symbols, for example as disclosed in FIGS. 9-11. For example, 1414 may be performed by transform component 1544 of apparatus 1502. In some aspects, the first network node may transform the plurality of symbols from the delay-Doppler domain to a time domain. In some aspects, the first network node may transform the processed plurality of symbols to a time domain. The PTRS may be measured based on the transformed symbols in the time domain.

At 1416, the first network node may perform phase noise tracking for a data channel, for example as disclosed in FIGS. 9-11. For example, 1416 may be performed by phase noise component 1546 of apparatus 1502. The first network node may perform the phase noise tracking for the data channel based on the measured PTRS.

At 1418, the first network node, to perform the phase noise tracking for the data channel based on the measured PTRS, may apply phase noise compensation on the transformed symbols in the time domain, for example as disclosed in FIGS. 11A and 11B. For example, 1418 may be performed by phase noise component 1546 of apparatus 1502. In some aspects, to perform the phase noise tracking for the data channel based on the measured PTRS, the first network node may convert the time domain samples back to the delay-Doppler domain of the OTFS.

Figure 15:
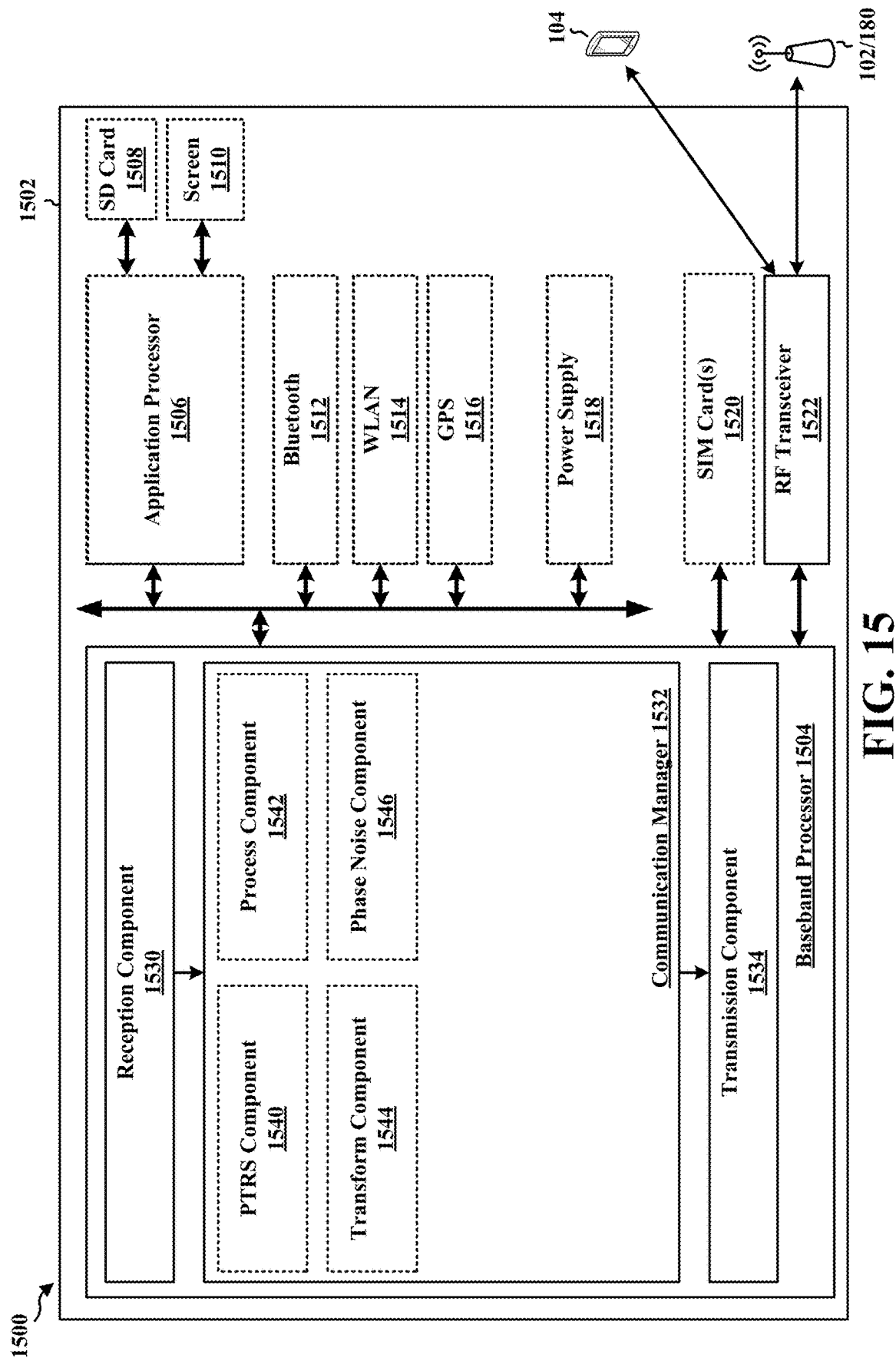
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The baseband processor 1504 communicates through the cellular RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a PTRS component 1540 that is configured to transmit information indicating a highest density PTRS that the first network node may process, e.g., as described in connection with 1402 of FIG. 14. The PTRS component 1540 may be further configured to receive information indicating a density of the PTRS, e.g., as described in connection with 1404 of FIG. 14. The PTRS component 1540 may be further configured to receive the PTRS, e.g., as described in connection with 1406 of FIG. 14. The PTRS component 1540 may be further configured to convert the PTRS, e.g., as described in connection with 1408 of FIG. 14. The PTRS component 1540 may be further configured to measure a PTRS using an OTFS including a delay-Doppler domain, e.g., as described in connection with FIG. 13 or 1410 of FIG. 14. The communication manager 1532 further includes a process component 1542 that is configured to process the plurality of symbols in the delay-Doppler domain, e.g., as described in connection with 1412 of FIG. 14. The communication manager 1532 further includes a transform component 1544 that is configured to transform the plurality of symbols, e.g., as described in connection with 1414 of FIG. 14. The communication manager 1532 further includes a phase noise component 1546 that is configured to perform phase noise tracking for a data channel, e.g., as described in connection with 1304 of FIG. 13 or 1416 of FIG. 14. The phase noise component 1546 may be further configured to apply phase noise compensation on the transformed symbols in the time domain, e.g., as described in connection with 1418 of FIG. 14.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband processor 1504, includes means for measuring a PTRS using an OTFS including a delay-Doppler domain. The OTFS includes a plurality of symbols in the delay-Doppler domain based on the PTRS. A first symbol of the plurality of symbols includes a first PTRS resource sample having a first value in the delay-Doppler domain. A second symbol of the plurality of symbols includes a second PTRS resource sample having a second value in the delay-Doppler domain. The first PTRS resource sample is adjacent to the second PTRS resource sample. The apparatus includes means for performing phase noise tracking for a data channel based on the measured PTRS. The apparatus further includes means for receiving, from a second network node, the PTRS. The apparatus further includes means for converting the PTRS into the delay-Doppler domain of the OTFS. The apparatus further includes means for transforming the plurality of symbols from the delay-Doppler domain to a time domain. The apparatus further includes means for processing the plurality of symbols in the delay-Doppler domain by performing channel estimation and channel equalization on the plurality of symbols in the delay-Doppler domain. The apparatus further includes means for transforming the processed plurality of symbols to a time domain. The PTRS is measured based on the transformed symbols in the time domain. The apparatus further includes means for applying phase noise compensation on the transformed symbols in the time domain. The apparatus further includes means for transmitting, to a second network node, information indicating a highest density of PTRS that the first network node can process. The PTRS included in the OTFS is based on the transmitted information. The apparatus further includes means for receiving, from a second network node, information indicating a density of the PTRS. The PTRS is measured based on the received information. The apparatus further includes means for converting the time domain samples back to the delay-Doppler domain of the OTFS. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication performed by a first network node comprising measuring a PTRS using an OTFS including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample; and performing phase noise tracking for a data channel based on the measured PTRS.

Aspect 2 may be combined with Aspect 1 and includes that the first value and the second value are based on a sequence.

Aspect 3 may be combined with any of Aspects 1 and 2 and includes that the sequence includes a ZC sequence or a PN sequence.

Aspect 4 may be combined with any of Aspects 1-3 and includes that the first value of the first PTRS resource sample is non-zero and the second value of the second PTRS resource sample is zero.

Aspect 5 may be combined with any of Aspects 1-4 and includes that the first symbol includes a first plurality of PTRS resource samples in the delay-Doppler domain, wherein each respective PTRS resource sample of the first plurality of PTRS resource samples has a respective value, wherein the first plurality of PTRS resource samples includes the first PTRS resource sample, wherein the second symbol includes a second plurality of PTRS resource samples in the delay-Doppler domain, wherein each respective PTRS resource sample of the second plurality of PTRS resource samples has a respective value, wherein the second plurality of PTRS resource samples includes the second PTRS resource sample.

Aspect 6 may be combined with any of Aspects 1-5 and includes that the respective value is non-zero for each respective PTRS resource sample in the first plurality of PTRS resource samples, and wherein the respective value is zero for each respective PTRS resource sample in the second plurality of PTRS resource samples.

Aspect 7 may be combined with any of Aspects 1-6 and includes that the respective value for each respective PTRS resource sample in the first plurality of PTRS resource samples is based on a sequence, and wherein the respective value for each respective PTRS resource sample in the second plurality of PTRS resource samples is based on the sequence.

Aspect 8 may be combined with any of Aspects 1-7 and includes that the first symbol includes a first plurality of PTRS resource samples in the delay-Doppler domain, wherein each respective PTRS resource sample of the first plurality of PTRS resource samples has a respective value, wherein the first plurality of PTRS resource samples includes the first PTRS resource sample, wherein each respective symbol of the plurality of symbols that is different from the first symbol includes a respective plurality of PTRS resource samples in the delay-Doppler domain, and wherein each respective PTRS resource sample of each respective symbol that is different from the first symbol has a respective value.

Aspect 9 may be combined with any of Aspects 1-8 and includes that the respective value is non-zero for each respective PTRS resource sample in the first plurality of PTRS resource samples, and wherein the respective value is zero for each respective PTRS resource sample of each respective symbol that is different from the first symbol.

Aspect 10 may be combined with any of Aspects 1-9 and includes that the respective value for each respective PTRS resource sample in the first plurality of PTRS resource samples is based on a sequence, and wherein the respective value for each respective PTRS resource sample of each respective symbol that is different from the first symbol is based on the sequence.

Aspect 11 may be combined with any of Aspects 1-10 and includes that the first symbol includes a first plurality of PTRS resource samples spaced apart along a delay axis in the delay-Doppler domain, wherein the first plurality of PTRS resource samples includes the first PTRS resource sample, wherein the second symbol includes a second plurality of PTRS resource samples spaced apart along the delay axis in the delay-Doppler domain, and wherein the second plurality of PTRS resource samples includes the second PTRS resource sample.

Aspect 12 may be combined with any of Aspects 1-11 and includes that PTRS resource samples of the first plurality of PTRS resource samples are spaced apart along the delay axis in the delay-Doppler domain by n delay-Doppler domain samples, wherein PTRS resource samples of the second plurality of PTRS resource samples are spaced apart along the delay axis in the delay-Doppler domain by n delay-Doppler domain samples, and wherein n is an integer greater than zero.

Aspect 13 may be combined with any of Aspects 1-12 and includes that the n delay-Doppler domain samples are data samples in the delay-Doppler domain.

Aspect 14 may be combined with any of Aspects 1-13 and includes that the first symbol includes a first plurality of PTRS resource samples that are adjacent along a delay axis in the delay-Doppler domain and a second plurality of PTRS resource samples that are adjacent along the delay axis in the delay-Doppler domain, wherein the first plurality and second plurality of PTRS resource samples of the first symbol are spaced apart along the delay axis in the delay-Doppler domain by n delay-Doppler domain samples, wherein the second symbol includes a first plurality of PTRS resource samples that are adjacent along the delay axis in the delay-Doppler domain and a second plurality of PTRS resource samples that are adjacent along the delay axis in the delay-Doppler domain, wherein the first plurality and second plurality of PTRS resource samples of the second symbol are spaced apart along the delay axis in the delay-Doppler domain by n delay-Doppler domain samples, wherein n is an integer greater than zero, wherein one of the first plurality or the second plurality of PTRS resource samples of the first symbol includes the first PTRS resource sample, and wherein one of the first plurality or the second plurality of PTRS resource samples of the second symbol includes the second PTRS resource sample.

Aspect 15 may be combined with any of Aspects 1-14 and includes that the first plurality and second plurality of PTRS resource samples of the first symbol each includes m adjacent PTRS resource samples, wherein the first plurality and second plurality of PTRS resource samples of the second symbol each includes m adjacent PTRS resource samples, wherein m is an integer greater than zero.

Aspect 16 may be combined with any of Aspects 1-15 and includes that the first symbol includes a first plurality of DMRS samples, and wherein the second symbol includes a second plurality of DMRS samples.

Aspect 17 may be combined with any of Aspects 1-16 and includes that the first plurality of DMRS samples is adjacent to the second plurality of DMRS samples in the delay-Doppler domain.

Aspect 18 may be combined with any of Aspects 1-17 and includes that the first PTRS resource sample is comprised within a first set of PTRS resource samples and the second PTRS resource sample is comprised within a second set of PTRS resource samples, wherein the first set of PTRS resource samples are adjacent to the second set of PTRS resource samples, wherein each of the first and second sets of PTRS resource samples include m adjacent PTRS resource samples along a delay axis in the delay-Doppler domain, wherein the first set of PTRS resource samples includes at least two PTRS resource samples that are spaced apart along the delay axis by n delay-Doppler domain samples, wherein the second set of PTRS resource samples includes at least two PTRS resource samples that are spaced apart along the delay axis by n delay-Doppler domain samples, wherein m is an integer greater than zero, and wherein n is an integer greater than zero.

Aspect 19 may be combined with any of Aspects 1-18 and includes that at least one of m or n is a function of at least one of an MCS for the PTRS, a number of RB s including the PTRS capable of being processed by the first network node, or a phase noise at the first network node.

Aspect 20 may be combined with any of Aspects 1-19 and includes that the OTFS further includes a plurality of DMRS samples that are adjacent along the delay axis and a Doppler axis in the delay-Doppler domain, wherein the first symbol includes at least one DMRS sample of a first set of DMRS samples and the second symbol includes at least one DMRS sample of the first set of DMRS samples, and wherein the first set of PTRS resource samples and the second set of PTRS resource samples are spaced apart from the plurality of DMRS samples by n doppler-domain samples or by z doppler-Domain samples, wherein z is different from n and is an integer greater than zero, wherein z PTRS resource samples are along the delay axis.

Aspect 21 may be combined with any of Aspects 1-20 and includes receiving, from a second network node, the PTRS; and converting the PTRS into the delay-Doppler domain of the OTFS.

Aspect 22 may be combined with any of Aspects 1-21 and includes transforming the plurality of symbols from the delay-Doppler domain to a time domain.

Aspect 23 may be combined with any of Aspects 1-22 and includes processing the plurality of symbols in the delay-Doppler domain by performing channel estimation and channel equalization on the plurality of symbols in the delay-Doppler domain; and transforming the processed plurality of symbols to a time domain, wherein the PTRS is measured based on the transformed symbols in the time domain.

Aspect 24 may be combined with any of Aspects 1-23 and includes that performing phase noise tracking for the data channel based on the measured PTRS includes applying phase noise compensation on the transformed symbols in the time domain.

Aspect 25 may be combined with any of Aspects 1-24 and includes transmitting, to a second network node, information indicating a highest density of PTRS that the first network node can process, wherein the PTRS included in the OTFS is based on the transmitted information.

Aspect 26 may be combined with any of Aspects 1-25 and includes receiving, from a second network node, information indicating a density of the PTRS, wherein the PTRS is measured based on the received information.

Aspect 27 may be combined with any of Aspects 1-26 and includes that the information is received in DCI.

Aspect 28 may be combined with any of Aspects 1-27 and includes that the information is transmitted in UCI.

Aspect 29 is a network node for wireless communication including at least one processor coupled to a memory, the at least one processor configured to implement the method as set forth in aspects 1-28.

Aspect 30 is a network node for wireless communication including means for implementing the method as set forth in aspects 1-28.

Aspect 31 is a computer-readable medium having code stored thereon that, when executed by a first network node, causes the first network node to implement the method as set forth in aspects 1-28.

What is claimed is:

1. A first network node for wireless communication, comprising:
    a memory; and
    at least one processor coupled to the memory, wherein the at least one processor is configured to:
        measure a phase tracking reference signal (PTRS) using an orthogonal time frequency space (OTFS) including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample; and
        perform phase noise tracking for a data channel based on the measured PTRS.

2. The first network node of claim 1, wherein the first value and the second value are based on a sequence.

3. The first network node of claim 2, wherein the sequence includes a Zadoff Chu (ZC) sequence or a pseudo-random noise (PN) sequence.

4. The first network node of claim 1, wherein the first value of the first PTRS resource sample is non-zero and the second value of the second PTRS resource sample is zero.

5. The first network node of claim 1, wherein the first symbol includes a first plurality of PTRS resource samples in the delay-Doppler domain, wherein each respective PTRS resource sample of the first plurality of PTRS resource samples has a respective value, wherein the first plurality of PTRS resource samples includes the first PTRS resource sample, wherein the second symbol includes a second plurality of PTRS resource samples in the delay-Doppler domain, wherein each respective PTRS resource sample of the second plurality of PTRS resource samples has a respective value, wherein the second plurality of PTRS resource samples includes the second PTRS resource sample.

6. The first network node of claim 5, wherein the respective value is non-zero for each respective PTRS resource sample in the first plurality of PTRS resource samples, and wherein the respective value is zero for each respective PTRS resource sample in the second plurality of PTRS resource samples.

7. The first network node of claim 5, wherein the respective value for each respective PTRS resource sample in the first plurality of PTRS resource samples is based on a sequence, and wherein the respective value for each respective PTRS resource sample in the second plurality of PTRS resource samples is based on the sequence.

8. The first network node of claim 1, wherein the first symbol includes a first plurality of PTRS resource samples in the delay-Doppler domain, wherein each respective PTRS resource sample of the first plurality of PTRS resource samples has a respective value, wherein the first plurality of PTRS resource samples includes the first PTRS resource sample, wherein each respective symbol of the plurality of symbols that is different from the first symbol includes a respective plurality of PTRS resource samples in the delay-Doppler domain, and wherein each respective PTRS resource sample of each respective symbol that is different from the first symbol has a respective value.

9. The first network node of claim 8, wherein the respective value is non-zero for each respective PTRS resource sample in the first plurality of PTRS resource samples, and wherein the respective value is zero for each respective PTRS resource sample of each respective symbol that is different from the first symbol.

10. The first network node of claim 8, wherein the respective value for each respective PTRS resource sample in the first plurality of PTRS resource samples is based on a sequence, and wherein the respective value for each respective PTRS resource sample of each respective symbol that is different from the first symbol is based on the sequence.

11. The first network node of claim 1, wherein the first symbol includes a first plurality of PTRS resource samples spaced apart along a delay axis in the delay-Doppler domain, wherein the first plurality of PTRS resource samples includes the first PTRS resource sample, wherein the second symbol includes a second plurality of PTRS resource samples spaced apart along the delay axis in the delay-Doppler domain, and wherein the second plurality of PTRS resource samples includes the second PTRS resource sample.

12. The first network node of claim 11, wherein PTRS resource samples of the first plurality of PTRS resource samples are spaced apart along the delay axis in the delay-Doppler domain by n delay-Doppler domain samples, wherein PTRS resource samples of the second plurality of PTRS resource samples are spaced apart along the delay axis in the delay-Doppler domain by n delay-Doppler domain samples, and wherein n is an integer greater than zero.

13. The first network node of claim 12, wherein the n delay-Doppler domain samples are data samples in the delay-Doppler domain.

14. The first network node of claim 1, wherein the first symbol includes a first plurality of PTRS resource samples that are adjacent along a delay axis in the delay-Doppler domain and a second plurality of PTRS resource samples that are adjacent along the delay axis in the delay-Doppler domain, wherein the first plurality and second plurality of PTRS resource samples of the first symbol are spaced apart along the delay axis in the delay-Doppler domain by n delay-Doppler domain samples, wherein the second symbol includes a first plurality of PTRS resource samples that are adjacent along the delay axis in the delay-Doppler domain and a second plurality of PTRS resource samples that are adjacent along the delay axis in the delay-Doppler domain, wherein the first plurality and second plurality of PTRS resource samples of the second symbol are spaced apart along the delay axis in the delay-Doppler domain by n delay-Doppler domain samples, wherein n is an integer greater than zero, wherein one of the first plurality or the second plurality of PTRS resource samples of the first symbol includes the first PTRS resource sample, and wherein one of the first plurality or the second plurality of PTRS resource samples of the second symbol includes the second PTRS resource sample.

15. The first network node of claim 14, wherein the first plurality and second plurality of PTRS resource samples of the first symbol each includes m adjacent PTRS resource samples, wherein the first plurality and second plurality of PTRS resource samples of the second symbol each includes m adjacent PTRS resource samples, wherein m is an integer greater than zero.

16. The first network node of claim 1, wherein the first symbol includes a first plurality of demodulation reference signal (DMRS) samples, and wherein the second symbol includes a second plurality of DMRS samples.

17. The first network node of claim 16, wherein the first plurality of DMRS samples is adjacent to the second plurality of DMRS samples in the delay-Doppler domain.

18. The first network node of claim 1, wherein the first PTRS resource sample is comprised within a first set of PTRS resource samples and the second PTRS resource sample is comprised within a second set of PTRS resource samples, wherein the first set of PTRS resource samples are adjacent to the second set of PTRS resource samples, wherein each of the first and second sets of PTRS resource samples include m adjacent PTRS resource samples along a delay axis in the delay-Doppler domain, wherein the first set of PTRS resource samples includes at least two PTRS resource samples that are spaced apart along the delay axis by n delay-Doppler domain samples, wherein the second set of PTRS resource samples includes at least two PTRS resource samples that are spaced apart along the delay axis by n delay-Doppler domain samples, wherein m is an integer greater than zero, and wherein n is an integer greater than zero.

19. The first network node of claim 18, wherein at least one of m or n is a function of at least one of a modulation and coding scheme (MCS) for the PTRS, a number of resources blocks (RBs) including the PTRS capable of being processed by the first network node, or a phase noise at the first network node.

20. The first network node of claim 18, wherein the OTFS further includes a plurality of demodulation reference signal (DMRS) samples that are adjacent along the delay axis and a Doppler axis in the delay-Doppler domain, wherein the first symbol includes at least one DMRS sample of a first set of DMRS samples and the second symbol includes at least one DMRS sample of the first set of DMRS samples, and wherein the first set of PTRS resource samples and the second set of PTRS resource samples are spaced apart from the plurality of DMRS samples by n doppler-domain samples or by z doppler-Domain samples, wherein z is different from n and is an integer greater than zero, wherein z PTRS resource samples are along the delay axis.

21. The first network node of claim 1, wherein the at least one processor is further configured to:
receive, from a second network node, the PTRS; and
convert the PTRS into the delay-Doppler domain of the OTFS.

22. The first network node of claim 1, wherein the at least one processor is further configured to:
transform the plurality of symbols from the delay-Doppler domain to a time domain.

23. The first network node of claim 1, wherein the at least one processor is further configured to:

process the plurality of symbols in the delay-Doppler domain, wherein to process the plurality of symbols in the delay-Doppler domain, the at least one processor is configured to perform channel estimation and channel equalization on the plurality of symbols in the delay-Doppler domain; and transform the processed plurality of symbols to a time domain, wherein the PTRS is measured based on the transformed symbols in the time domain.

24. The first network node of claim 23, wherein to perform the phase noise tracking for the data channel based on the measured PTRS, the at least one processor is configured to:

apply phase noise compensation on the transformed symbols in the time domain.

25. The first network node of claim 1, wherein the at least one processor is further configured to:

transmit, to a second network node, information indicating a highest density of PTRS that the first network node can process, wherein the PTRS included in the OTFS is based on the transmitted information.

26. The first network node of claim 1, wherein the at least one processor is further configured to:

receive, from a second network node, information indicating a density of the PTRS, wherein the PTRS is measured based on the received information.

27. The first network node of claim 26, wherein the information is received in downlink control information (DCI).

28. The first network node of claim 25, wherein the information is transmitted in uplink control information (UCI).

29. A method of wireless communication performed by a network node, comprising:

measuring a phase tracking reference signal (PTRS) using an orthogonal time frequency space (OTFS) including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample; and performing phase noise tracking for a data channel based on the measured PTRS.

30. A non-transitory computer-readable medium having code stored thereon that, when executed by a network node, causes the network node to:

measure a phase tracking reference signal (PTRS) using an orthogonal time frequency space (OTFS) including a delay-Doppler domain, wherein the OTFS includes a plurality of symbols in the delay-Doppler domain based on the PTRS, wherein a first symbol of the plurality of symbols includes a first PTRS resource sample having a first value in the delay-Doppler domain, wherein a second symbol of the plurality of symbols includes a second PTRS resource sample having a second value in the delay-Doppler domain, and wherein the first PTRS resource sample is adjacent to the second PTRS resource sample; and perform phase noise tracking for a data channel based on the measured PTRS.

* * * * *